United States Patent [19]

Cook

[11] 4,029,932

[45] June 14, 1977

[54] LINED PIPE, AND METHOD AND APPARATUS FOR MAKING SAME

[75] Inventor: Melvin S. Cook, Saddle River, N.J.

[73] Assignee: Holobeam, Inc., Paramus, N.J.

[22] Filed: May 5, 1975

[21] Appl. No.: 574,537

[52] U.S. Cl. .................. 219/121 LM; 138/144; 219/121 L

[51] Int. Cl.² ............... B23K 26/00; F16L 9/14

[58] Field of Search .... 219/62, 76, 121 L, 121 LM, 219/137; 138/140, 141, 143, 144, 147, 150

[56] References Cited

UNITED STATES PATENTS

| | | | |
|---|---|---|---|
| 2,631,015 | 3/1953 | Probst | 257/208 |
| 3,731,041 | 5/1973 | Gebauer | 219/62 |
| 3,735,478 | 5/1973 | Porter et al. | 219/62 X |
| 3,789,181 | 1/1974 | Netterstedt et al. | 219/62 |

Primary Examiner—J. V. Truhe

Assistant Examiner—Clifford C. Shaw
Attorney, Agent, or Firm—Gottlieb, Rackman & Reisman

[57] ABSTRACT

There is disclosed apparatus for lining the interior of a metal pipe with a resistant metal. A resistant metal ribbon is fed from a roll external to the pipe and is drawn into the pipe by a first trolley which moves inside the pipe from one end of the pipe to the other. The first trolley shapes the ribbon into a spiral with overlapping edges. A laser beam is directed along the pipe and is redirected by a second trolley, which moves in synchronism with the first, toward the region at which the ribbon is being laid down against the pipe, the laser beam serving to weld overlapping edge regions of ribbon to each other. Special weld patterns are disclosed for preventing the leaks through the lining even in the presence of anticipated weld flaws.

88 Claims, 40 Drawing Figures

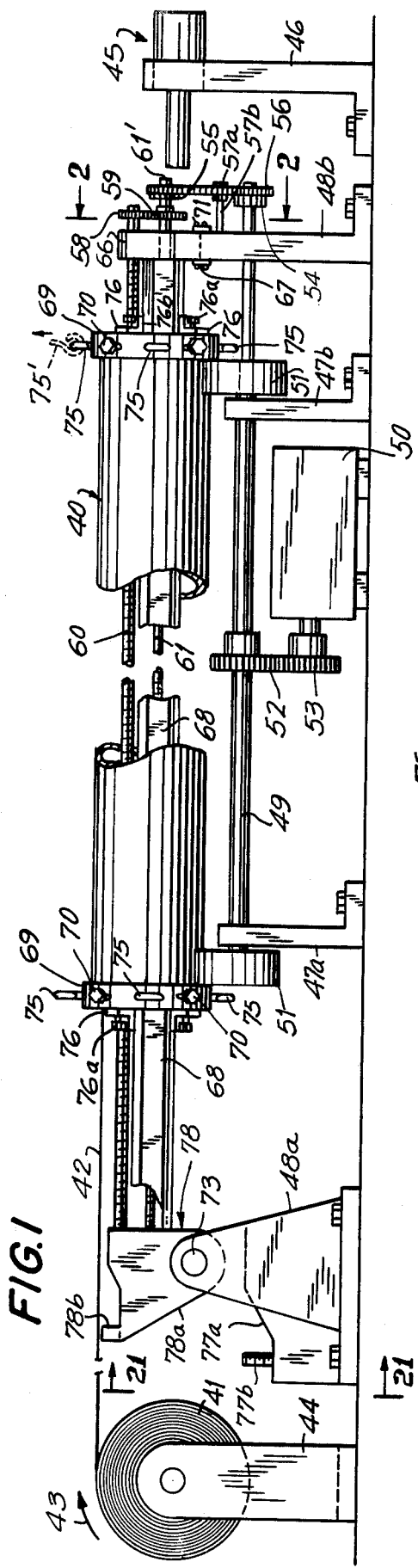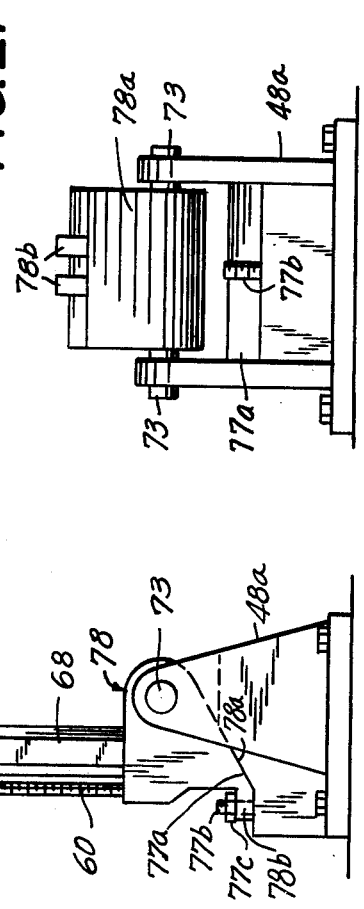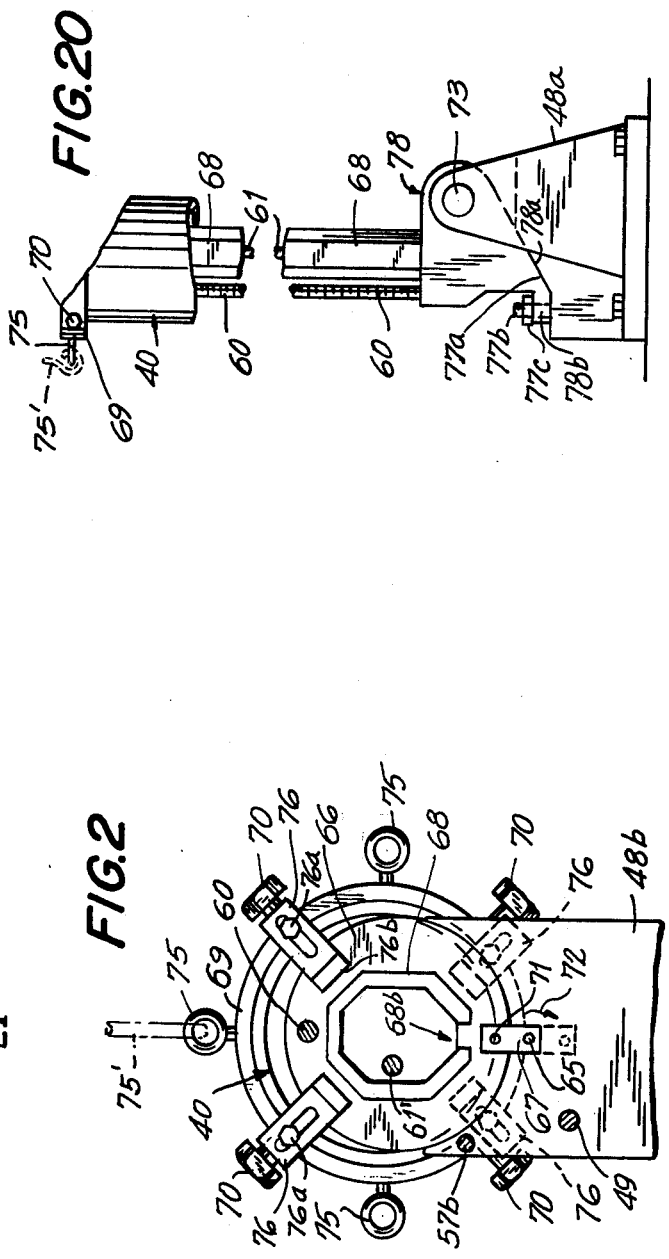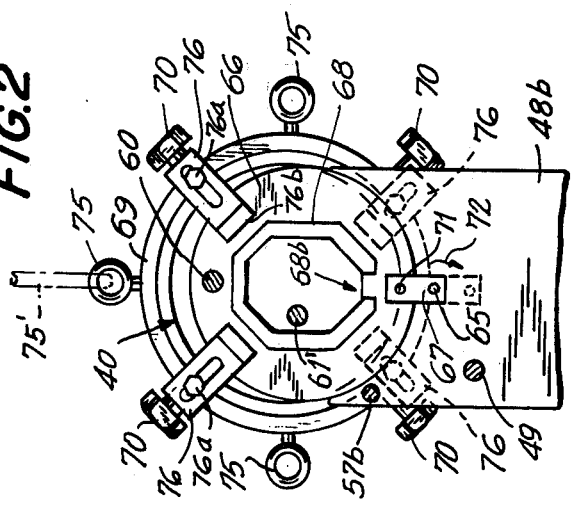

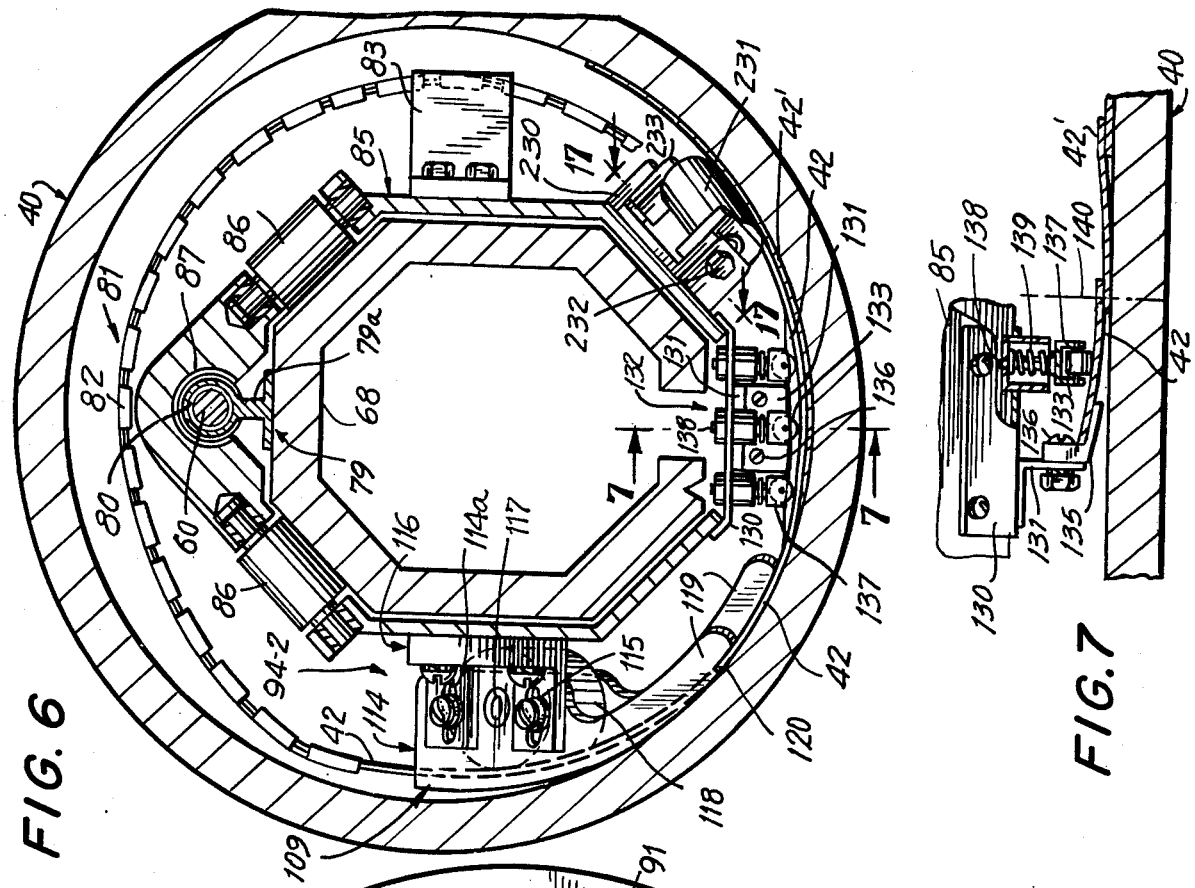
FIG.6
FIG.7
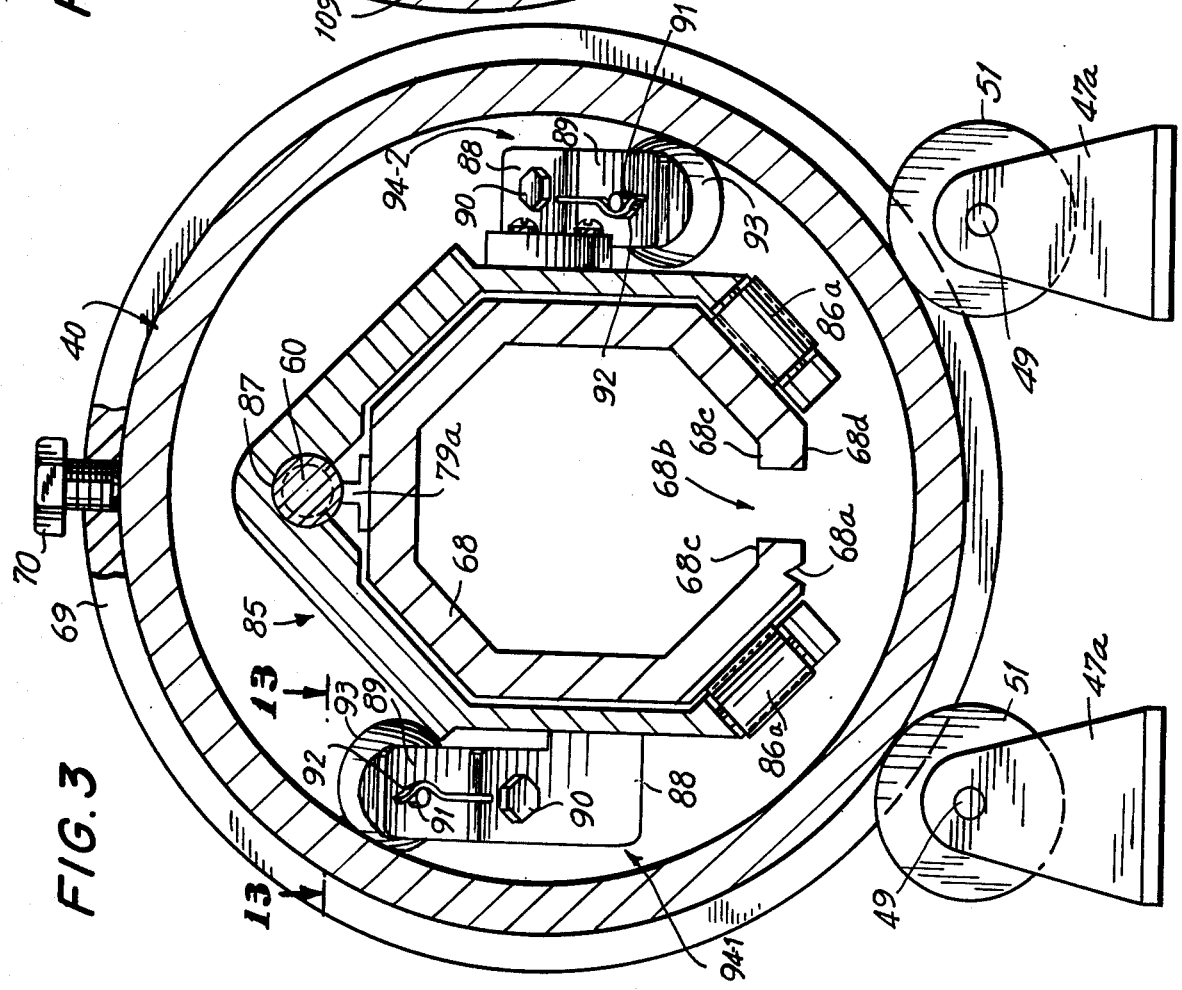
FIG.3

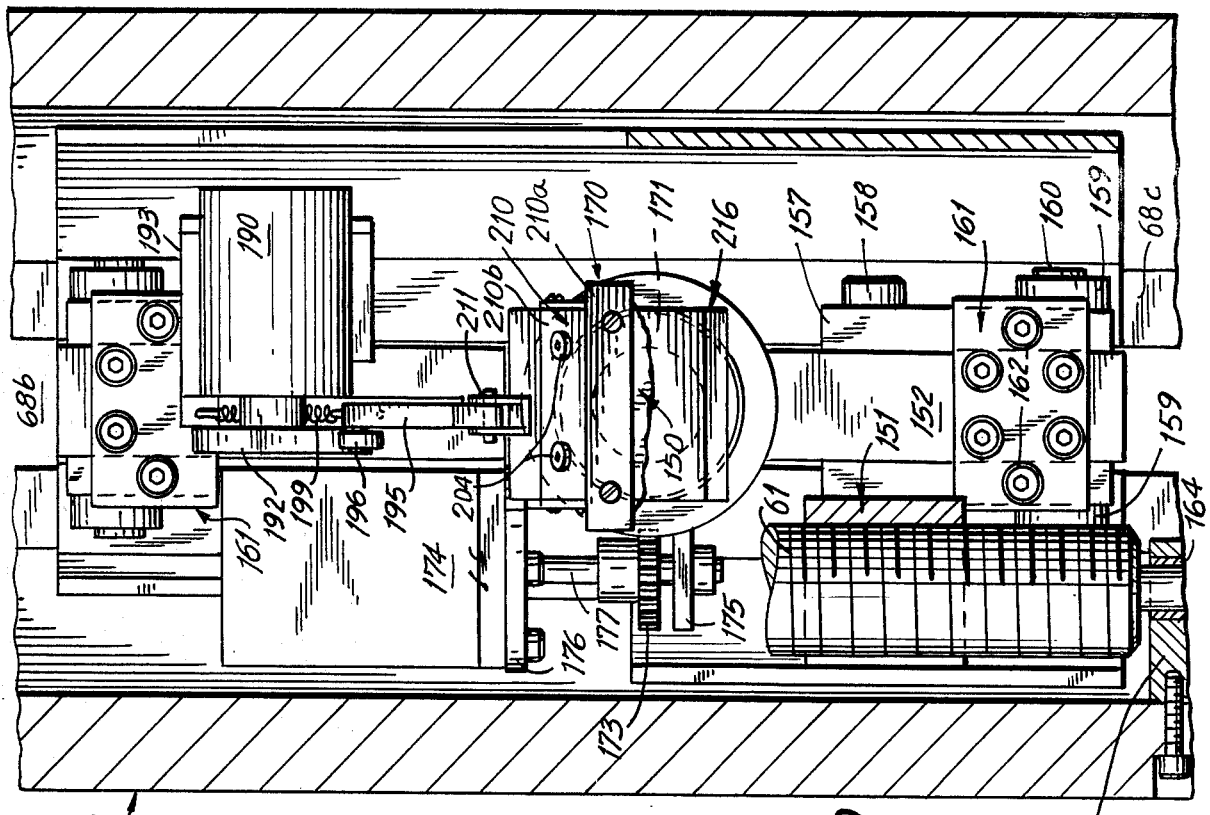
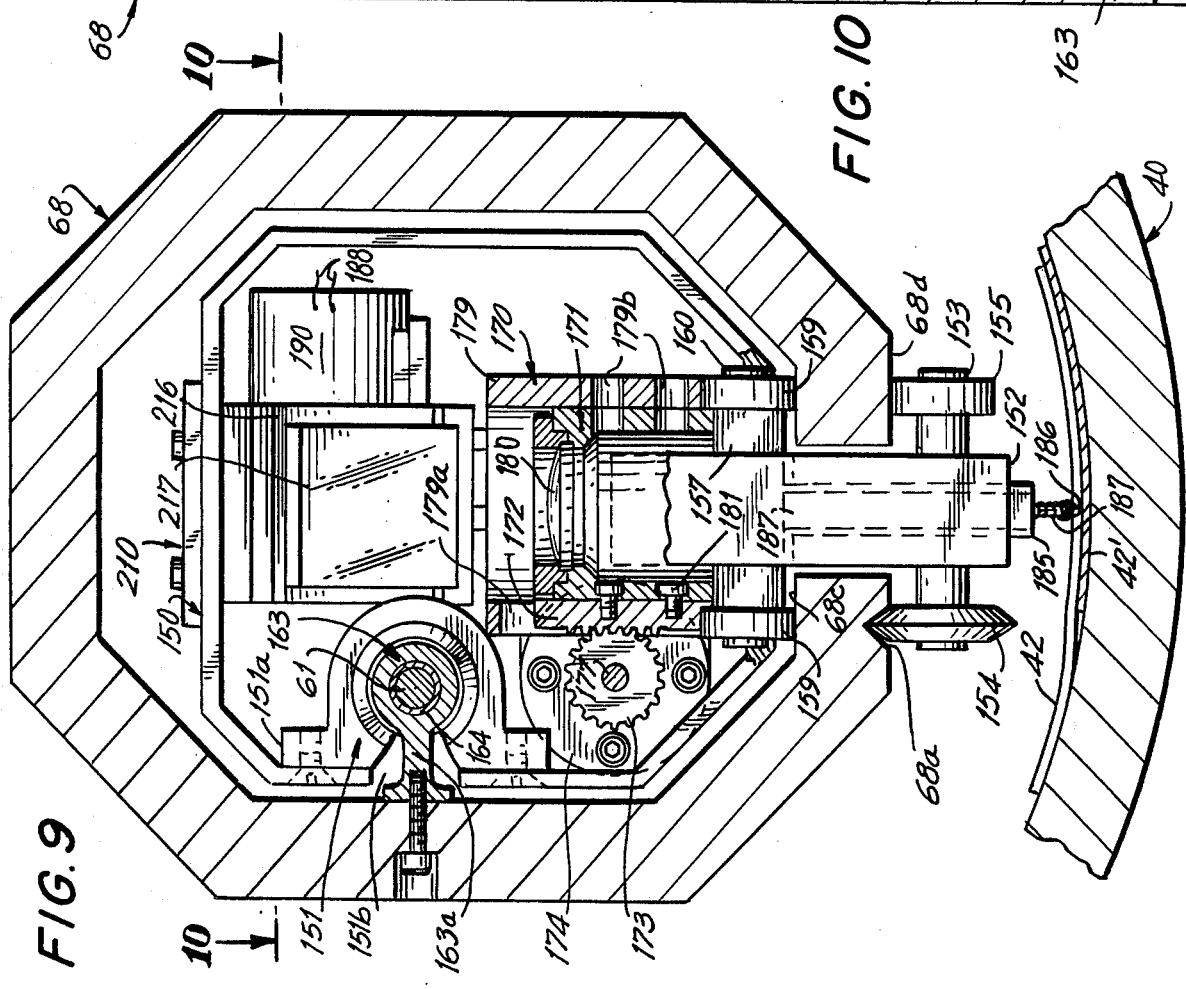
FIG. 10
FIG. 9

LINED PIPE, AND METHOD AND APPARATUS FOR MAKING SAME

This invention relates to pipes and other vessels which are lined, either internally or externally, with strip material, and more particularly to methods and apparatus for producing lined pipes by laser welding.

In many applications where an abrasive or corrosive fluid must pass through a pipe, or where the fluid passing through the pipe must not be contaminated, pipes made of resistant metal or non-metallic materials are employed. Unfortunately, due to the high cost or unavailability of resistent metal pipes, they are not employed to the extent that they otherwise would be. As a practical compromise, in order to minimize the cost of piping, ordinary or low-carbon steel pipes are often used despite the fact that they may have to be replaced or repaired periodically. Such cost or availability considerations are often factors in the design of chemical plants, refineries, and piping systems.

Numerous prior are workers have considered this problem and have devised various solutions to it. The general technique entails the lining of the interior wall of a low-cost pipe with a sheet of desired material. It is a low-carbon steel pipe, for example, that provides the necessary strength, while an interior stainless-steel lining provides what is in effect a protective covering.

Although in the illustrative embodiment of the invention a metal pipe is internally clad with a thin sheet of resistant metal, it is to be understood that the present invention is not limited to metal pipes and linings. Just as the prior art contemplated various pipe/lining material combinations, depending upon the particular use envisaged for the finished product, so, in accordance with the present invention, what is contemplated is a technique which is applicable to any desired weldable lining for a vessel or pipe of any given material. It is noted, however, that the greatest benefit presently foreseen for the invention is the cladding of metal pipes with thin resistant metal linings. (Similarly, while in the illustrative embodiment of the invention it is the interior wall of a pipe which is lined, it is to be understood that in a comparable manner the exterior wall of a pipe may be lined. It is much easier to line the exterior wall of a pipe since there is far more space to "work in". The exterior of a pipe or other vessel may have to be corrosion resistant, for example, if it is placed in an aggressive environment, e.g., a pipe placed inside a vessel or pipe of larger diameter in a heat-exchanging relationship.)

One obvious way to protect the interior wall of a pipe is to coat it with lining material in fluid form and subsequently to convert this fluid to an adherent solid covering. While this may be satisfactory for some special applications, not only is high integrity and uniform sufficient thickness of the lining difficult or expensive to achieve, but it is impossible to adequately line a pipe this way with broad classes of the most important lining materal — resistant metal, e.g., stainless steel. Another approach is to insert a thin-wall pipe of one material inside an outer thick-wall pipe. It was proposed, for example, almost 100 years ago in Smith U.S. Pat. No. 171,440, issued on Dec. 21, 1875, to insert one pipe inside a second pipe with a small clearance between them, and then to expand the inner pipe (e.g., by forcing through it a plug) to bring its outer surface into contact with the interior surface of the outer pipe. This technique, however, is not generally practical for a variety of reasons, included among them the fact that the expanded interior pipe may not remain in intimate contact with the outer pipe, a detriment where high pressures are encountered, and the fact that inner pipes of only some materials (brittle metals generally not being among them) can be expanded in this way in the first place.

Another technique of producing a lined pipe is by electrodeposition of a metal such as nickel on the inner surface in thicknesses of 0.008 inch to 0.015 inch, depending on the specific application. While this produces a desirable product, it is expensive (typically, such a pipe is about 80% more costly than one of solid Type 304 stainless steel).

It was proposed in Bayles U.S. Pat. No. 418,154, issued on Dec. 31, 1889, to form first an interior lining, for example, by winding a long ribbon of steel into a spiral with overlapping edges, and then to cast an iron shell around it. This, too, is an impractical approach due to the difficulty of casting the main pipe around a pre-formed lining while assuring that no leakage paths exist.

As did Bayles, others also proposed to make the lining from sheet material wound in the form of a spiral. Some prior art workers carried this concept to the extent of forming not only an interior lining, but also the exterior pipe, from two-layer ribbon material, with the overlapping edge regions of the spiral being welded together. For example, a relatively thick strip of carbon steel may have fixed to it a thin strip of stainless steel, with the spiral being formed such that the stainless steel constitutes an interior lining and with the outer shell or pipe being formed at the same time that the interior lining is formed. Examples of this technique are to be found in Taylor U.S. Pat. No. 1,928,118 dated Sept. 26, 1933 and Porter et al. U.S. Pat. No. 3,735,478 dated May 29, 1973. This overall approach generally suffers from the disadvantages of high cost, difficulty of fabrication, and the difficulty of forming uncontaminated welds of perfect integrity. (It is apparent that a single weld flaw or welds contaminated with outer shell material may result in a leak not only through the lining but through the composite pipe as well).

Another prior art technique is that shown in Probst U.S. Pat. No. 2,631,015 issued on Mar. 10, 1953. In this patent it is proposed to form from a continuous strip, e.g., of stainless steel, a lining in the form of a helical coil against the inside surface of a pipe or vessel, the coil having partly overlapping turns and with a continuous weld being made at the exposed edge of the helical coil as it is continuously wound. This is somewhat similar to the type of lining which is formed in the illustrative embodiment of the present invention. However, the Probst-type lined pipe, and the method of making it, have several important disadvantages which it is an object of the present invention to overcome.

First is the fact that while it is easy to visualize the finished product, it is not easy to make it. To form the helical coil, and weld it, are difficult to do in accordance with this prior are teaching unless relatively large equipments can enter the pipe.

But quite apart from manufacturing difficulties, the finished product suffers from two disadvantages, one minor and one major. The minor disadvantage is that any filler material used to make the weld and the subsequent weld must be corrosion-resistant; this, coupled with the cost of the weld material increase the manufacturing cost of the finished product. However, the greatest disadvantage is that a single flaw in the weld may well result in an attack all along the interior of the outer shell by the corrosive or otherwise aggressive fluid which flows inside the lined pipe in use. Since the lining is formed by laying the ribbon in the form of a coil or spiral, the weld along the edge of the overlapped ribbon is also in the shape of a spiral. Moreover, because on the inside of the pipe the ribbon does not lay flat against the pipe, but rather has one edge against the pipe and the other edge on top of a previously laid turn, it is apparent that there is some empty space — also in the shape of a spiral — between the lining and the pipe. Consequently, a single flaw in the spiral weld results in seepage of fluid through the lining into the empty space between the lining and the outer shell, potentially capable of traversing the length of the pipe. Despite the fact that Probst states that the continuous spiral passageway between the lining and the pipe can be used to advantage for testing purposes, its presence can spell disaster if the weld lacks complete integrity.

The situation would be little better even were a single leak not to result in the attack of the entire wall of the pipe by the aggressive fluid. It must be realized that a single flaw resulting even in only a local attack on the pipe may result in sufficient weakening to require repair or replacement of the pipe, and the length of the weld is much greater than the length of the pipe because in a typical application there are many turns of ribbon in the interior coil.

Of interest in regard to the lining of pipes is Hill et al. U.S. Pat.No.3,508,317, issued on Apr. 28, 1970. In that patent there is disclosed a machine for lining a tunnel by forming a helical winding from strip material which is pulled off a roll. Although there is no overlap of turns of the strip material, and although there is no exterior shell or pipe to which the lining is secured, the patent is of interest in that it does disclose apparatus for forming a "lining" automatically. Reference to the Hill et al. patent, however, makes it clear that the apparatus is totally impractical for pipes other than those which are many feet in diameter; the pipes or vessels which can be lined in accordance with the principles of my invention may be under eighteen inches in diameter. Moreover, Hill et al. in no way suggests how to avoid the degrading effect of even a single weld flaw.

It is a general object of my invention to provide a pipe having a lining formed of welded strip material, for example, in the shape of a spiral, and to further provide a method and apparatus for economically, automatically and rapidly making such a pipe in which the lining is of exceptionally high integrity.

Before actually presenting a brief description of the invention, it will be helpful to consider some of the factors which entered into the design of a practical implementation. Ribbon metal can be purchased in the form of a coil or roll, the ribbon or strip being hundreds of feet long. Such metals include, for example, stainless steels, alloy metals, titanium, and nickel. A convenient orientation for such a roll, as the interior of a pipe is being lined, would be with its axis in the axial direction of the pipe. The roll could actually be moved from one end of the pipe to the other along its axis; as the roll is moved, it could be unwound so that the ribbon which is fed off from the roll could be used to form a spiral lining for the pipe. Unfortunately, this approach — disclosed in the Hill et al. patent — is not practical unless very small rolls of ribbon are used or unless only large diameter pipes are to be lined.

Except for large diameter pipes, it is necessary for the roll of metal strip to be located external to the pipe, that is, for the metal strip to be drawn off the roll into the pipe and in a direction more or less parallel to the axial direction of the pipe. One of the major problems which has to be solved, then, is the formation of a spiral inside the pipe from a strip which is fed in along the axial direction of the pipe. Whatever mechanism is used to form the spiral inside the pipe, it must not only be compact so that it can fit within the pipe and more relative to it, but it must further allow a weld to be formed at the same time. At first glance, it would appear to be exceedingly difficult to make a continuous weld as the helical winding is being formed, particularly with small-diameter pipes.

Lastly, the weld must be such that there are no leaks through the lining. As mentioned above, with conventional welding equipment and techniques, it is highly probably that there will be at least one flaw in the spiral edge weld from one end of the pipe to the other, and it takes only one such flaw in the prior art to compromise the integrity of the lining. It is exceedingly difficult to make a "perfect" spiral weld even in a large-diameter pipe. It is even more difficult to do so in smaller diameter pipes with "automatic" equipment which has to move inside the pipe from one end to the other while performing a welding operation at the same time as the lining is put into place.

In accordance with the principles of my invention, a pipe which is to be metal-lined on its interior wall is supported horizontally on top of at least one pair of rollers. A motor drives at least one roller, which in turn causes the pipe to rotate. Extended along the interior of the pipe is a stationary "trolley guide" whose cross-section has the general configuration of a hollow octagon open on one side. Mounted for movement along the trolley guide through the pipe is a "spiral-forming trolley" whose function is to take the ribbon which is fed from a roll in a direction parallel to the pipe axis and to shape it into a spiral for lining the interior of the pipe.

The spiral-forming trolley is mounted on the outside of the trolley guide or on the inside of the pipe and is driven from one end of the pipe to the other. On the spiral-forming trolley there is a shaping mechanism for forming the strip into a spiral shape. This mechanism shapes the strip in such a manner that the pitch of the spiral which is formed decreases gradually until at the point of lay-down of the ribbon against the interior wall of the pipe the spiral pitch is small enough to permit edge regions of successive turns of ribbon to overlap each other. At the end of the spiral-forming trolley, the lining strip is positioned such that it is laid down against the interior wall of the pipe at the bottom, just below the opening in the trolley guide.

It is important that the metal strip be drawn through the spiral-forming trolley at a rate sufficient to form the spiral at the lay-down point at the trolley exit. The rate at which the strip must be laid down against a pipe depends upon the rotational speed of the pipe; the faster the speed of the turning pipe, the faster must the strip be laid down at the bottom of the pipe. The strip shaping mechanism includes rollers which bear against the interior wall of the pipe. The rollers, which are driven by the rotating pipe, in turn drive other rollers which actually draw and shape the strip. In effect, it is the pipe itself which provides one of the controls for the drawing in of the strip at the proper rate to form the spiral.

At the same time that the pipe turns, and the spiral-forming trolley draws in and shapes the strip and lays it down against the bottom of the pipe, a worm gear causes the trolley to move from one end of the pipe to the other along the trolley guide. The linear speed of the spiral-forming trolley along the trolley guide determines the degree of overlap of edge regions of adjacent turns of the spiral as strip is laid down by the trolley. In this way, the spiral-forming trolley, whose dimensions are such that the trolley can be contained in the space between the outside of the trolley guide and the interior wall of the pipe, forms the spiral lining inside the pipe from straight strip which is fed from a supply roll into one end of the pipe.

The weld is formed by energy transmitted from a laser which is positioned in line with the pipe but external to it. The laser beam is directed along the interior of the pipe. A second trolley, the "weld-forming trolley", is provided for movement largely inside the trolley guide. This trolley is driven by a second worm gear, both trolleys moving at the same speed from one end of the pipe to the other. The weld-forming trolley is provided with a mirror which for the moment may be thought of as being at an angle of approximately 45° to the horizontal. This mirror redirects the laser beam which is directed along the interior of the trolley guide, the beam being deflected downward through the opening in the guide onto that region where the spiral lining is being laid down onto the pipe. The laser beam is focused onto the overlapped region of the strip (the "edge region") where the strip is being laid down against the underlapped edge region of the previously laid adjacent turn. Since the two trolleys move at the same speed, a weld is formed from one end of the pipe to the other, at the same time that the pipe is being spirally lined with the steel strip.

A major advantage of the use of laser welding is that the welding apparatus can be external to the pipe when this is more convenient than locating the laser in the interior of the pipe, e.g., for pipes of small diameter. Equally important is the fact that no added filler weld material is required; the heat of the laser is sufficient to weld the overlapping edge regions of the strip forming the spiral to each other. In fact, the heat of the laser is sufficient to weld not only the layers of the spiral to each other, but also the spiral lining to the interior wall of the pipe itself. It is not necessary that the lining be welded to the pipe all along the spiral. It is only necessary that the spiral weld along the overlapping edges of the metal lining strip be continuous from one end of the pipe to the other. For this reason, it is sufficient to use a first power level of the laser beam for forming the spiral weld, and to spot weld the lining to the pipe only periodically with a momentary increase of power to a second higher level. As most lasers can tolerate brief operation above their average power level, a smaller (less expensive) laser can be used when continuous welding to the underlying pipe is not essential. It should be noted that a similar effect can be accomplished by causing the laser beam to dwell at the welding point. As will be described below, the weld-forming trolley is provided with means for raising or lowering a focusing lens depending upon slight variations in pipe shape; the trolley is provided with a sensor to detect such variations. (It will be apparent that the focusing lens may be located between the laser and the mirror.) In this way, the laser beam may be focused through the trolley optics in such a way that the spot size at the point of the weld is maintained relatively constant (in order to accomplish uniform welds).

As mentioned above, if all that is formed is a simple spiral weld from one end of the pipe to the other, a single flaw can give rise to a leak. No matter how reliable the laser welding equipment, the state of the art is such that in a typical pipe, e.g., an 18-inch diameter, 20-foot long pipe lined with 2-inch wide steel strip, there is a high probability of there being one or more flaws. For this reason, the mirror is not kept stationary as the two trolleys move along the guide. Instead, the mirror is moved so that the weld line formed is not simply a "pure" spiral. As will be described in detail below, various mirror movements may be employed, more than one mirror or other beam deflectors may be employed, and it may require more than one pass of the weld-forming trolley along the pipe in order to effect the desired weld pattern. In this brief description, it will suffice to describe a typical weld, although not the weld formed in the illustrative embodiment of the invention, to illustrate the principle which governs the selection of the weld pattern.

Consider a weld through the overlapping edge regions of the metal strip whose general shape from one end of the pipe to the other is in the form of a spiral, but which actually consists of small, successive overlapping circles. The entire weld pattern is contained within the overlapped edge regions of the strip. In order for there to be a leak, there must be at least two flaws on opposite sides of any localized region of the weld pattern. The weld pattern can be analogized to a chain comprised of a series of iron links. A single slice through a link does not cause a break in the chain. It is only when there are two slices through a link, on opposite sides, that the chain actually breaks. In a similar fashion, it is only when there is a flaw on each of the two sides of a localized region in the weld pattern that the fluid on the inside of the lining can seep through the lining to the pipe. It has been found that flaws in welding are substantially independent of each other. Even if there are several flaws in the weld pattern from one end of the pipe to the other, if there are many thousands of intersecting circles in the weld pattern, it is extremely unlikely that there will be two flaws on opposite sides of any single circle in the overall weld pattern. Consequently, it is highly improbable that there will be a leak in the lining, even if the welding apparatus is not perfect.

Further objects, features and advantages of my invention will become apparent upon consideration of the following detailed description in conjunction with the drawing, in which:

FIG. 1 is a side view, shown partially broken away, of the overall apparatus for lining a pipe in accordance with the principles of my invention.

FIG. 2 is a view taken along line 2—2 in FIG. 1;

FIG. 3 is a sectional view through the pipe to be lined and the spiral-forming trolley which moves through the pipe, various elements being omitted in FIG. 3 for the sake of clarity;

FIG. 6 is a sectional view taken along line 6—6 in FIG. 5;

FIG. 7 is a sectional view taken along line 7—7 in FIG. 6;

FIG. 9 is a sectional view through the weld-forming trolley taken along line 9—9 in FIG. 8;

FIG. 10 is a sectional view taken along line 10—10 in FIG. 9;

FIG. 20 depicts a partial view of the right end of the apparatus in FIG. 1 with the apparatus in an erected position for emplacement of a pipe or removal of a lined pipe from the apparatus;

FIG. 21 is a sectional view of support block 48a taken along line 21—21 in FIG. 1;

Figure 4A:
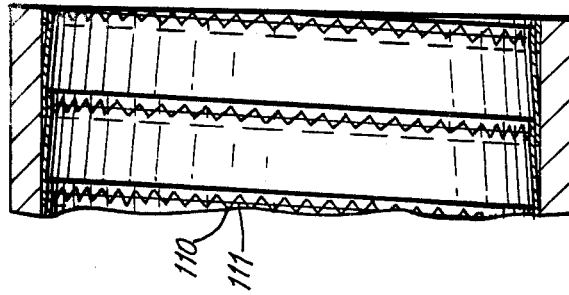
FIG. 4a is a similar sectional view through the end of the pipe showing the complete weld pattern.

In the apparatus of FIG. 1, a metal pipe 40 is shown mounted for having its interior wall lined by a resistant metal ribbon. Two support blocks 47a are disposed at one end of the pipe, as seen most clearly in FIG. 3, and another two support blocks 47b are disposed at the other end. Extending through each pair of support blocks 47a, 47b, there is a shaft 49 on which are mounted two rubber-covered rollers 51. A motor 50 is provided for turning one of shafts 49 through gears 52, 53. Thus a pair of rollers 51 on one side of the pipe rotate and cause the pipe to turn. The pipe 40 is maintained aligned between support blocks 47a, 47b by providing two removable collars 69 which bear against the sides of rollers 51 at opposite ends of the pipe. The collars have bolts 70 for securing them in fixed positions on the pipe 40 and eyebolts 75 through which hooks 75' may be passed. When the apparatus is erected for pipe emplacement or removal (as will be described below), a pipe can be removed from or emplaced on the apparatus by use of a crane or pulleys attached by hooks 75' to the eyebolts 75. The eyebolts 75 can also be used for erecting the apparatus to a vertical position or lowering it to a horizontal position using the crane or pulleys.

Another pair of support blocks 48a, 48b is provided as shown in FIG. 1. Extended between these support blocks are a trolley guide 68, and two worm gears 60, 61, as seen most clearly in FIGS. 1 and 2. The spiral-forming trolley and the weld-forming trolley move along trolley guide 68, on the outside and inside of the guide, respectively, as will be described below. The two trolleys are caused to move along guide 68 from one end of the pipe to the other by worm gears 60, 61. The worm gears are driven by motor 50. As shown in FIG. 1, the drive shaft 49 is extended through support block 48b and terminates at sprocket 54. Shaft 61', an extension of worm gear 61, terminates at sprocket 55, and chain 56 serves to drive sprocket 55 from sprocket 54. Chain 56 is tensioned by a tension idler 57a mounted on support block 48b by shaft 57b. Gear 59 on shaft 61' meshes with gear 58 which is fixed to the end of worm gear 60. Consequently, both worm gears turn when the pipe is rotated. The reason that separate trolley drives are provided, even though the two trolleys move together, is that the weld-forming trolley, which contains the optics necessary to redirect and focus and laser beam to form the weld, should be as vibration-free as possible and toward this end it is preferable to provide some degree of isolation for it from the spiral-forming trolley.

It is apparent that in order to remove the pipe from the apparatus, or to place a new pipe on the apparatus, e.g., by lifting or lowering the pipe, it is necessary to remove the trolley guide and the worm gears from inside the pipe. For this reason, support block 48b is provided with a removable upper section 66, upper section 66 being shown in FIG. 2. On either side of section 66 and support block 48b there is a metal plate 67 attached to a bolt at 65 around which the plates can pivot. The two plates can be rotated in the direction of arrow 72 to the position shown by the phantom lines, in which position section 66 is not secured to bracket 48b. When it is desired to secure the two elements 66, 48b together, the two plates 67 are rotated to the position shown in FIG. 2, and a bolt 71 is extended through holes provided for this purpose as well as a hole provided in section 66 and fastened into position. It will be apparent that other locking mechanisms can be employed, the important thing being that the section 66 be removable from support block 48b. When it is desired to remove or emplace a pipe, the section 66 is unbolted from support block 48b by removing bolt 71 and plates 67 are rotated to the position shown in phantom in FIG. 2. Tension idler 57a is removed from chain 56, and the chain is removed from sprockets 54, 55. The apparatus is then erected to the vertical position.

Although end section 66 and the interconnected trolley guide 68 and worm gears 60, 61 can thus be removed from a pipe mounted on the apparatus, if the pipe is pulled up off the erected apparatus, it is apparent that the pipe could scrape against the elements mounted within it. To prevent this, the collars 69 have elements 76 (seen most clearly in FIG. 2) which can be slid into position against trolley guide 68, with its surface 76b bearing against the guide, and fixed there by bolts 76a prior to erecting the apparatus. Support block 48a has an upper section 78 hinged around a shaft 73. After elements 76 are positioned against trolley guide 68, a crane attached to the apparatus by hooks 75' erects the apparatus which pivots around shaft 73 until surface 78a of upper section 78 bears against surface 77a of support block 48a. Support block 48a is shown in FIG. 20 with the apparatus in the erect position. Support block 48a is locked into the erected position by nut 77c bearing against fingers 78b attached to upper section 78 (see FIG. 21) and screwed onto bolt 77b attached to support block 48a. When the apparatus is locked into the erected position, the elements 76 are loosened and slid to the extreme position away from trolley guide 68 and locked into the new position. The crane then lifts the lined pipe from the apparatus and emplaces a new pipe into position. The elements 76 are then once again locked into position against the trolley guide 68, nut 77c is removed from bolt 77b, the apparatus is lowered by the crane to the horizontal position, and upper section 66 is again fastened to support block 48b using bolt 71. The elements 76 are then again locked into position in their locations away from trolley guide 68, chain 56 is replaced on the sprockets 54, 55, and the tension idler 57a is engaged with the chain 56. The hooks 75' are then removed from eyebolts 75 and the lining of the new pipe can begin.

At the left of FIG. 1, there is shown a support block 44 on which there is mounted a supply roll 41 of metal ribbon. The ribbon, shown by the numeral 42, is drawn from the supply roll in the direction of arrow 43 and is extended into the pipe as seen in FIG. 1. Although the ribbon is drawn into the pipe in a direction substantially parallel to the pipe axis, the spiral-forming trolley shapes the ribbon into the form of a spiral for lay-down against the interior pipe wall.

Both trolleys are initially positioned at the right end of the pipe in FIG. 1, the ribbon thus traversing essentially the entire length of the pipe before the lining operation actually commences. As the two trolleys move from the right end of the pipe to the left end under control of worm gears 60, 61, the spiral-forming trolley lays the ribbon down against the inside wall of the pipe. A laser 45 is shown mounted on bracket 46 at the right end of the apparatus, the laser beam being directed along the interior of the trolley guide 68. The spiral-forming trolley functions to lay down the ribbon at the bottom of the pipe, the ribbon being drawn in by this trolley as it moves to the left and is laid down against the bottom of the pipe. As the pipe is rotated, the ribbon is continuously laid down and forms a spiral lining for the pipe. (It is important to note that the spiral lining itself is actually formed at the bottom region of the pipe). In this way, all that is required to weld the overlapping edge regions of the spiral lining to each other is to redirect and focus the laser beam downward toward the bottom of the pipe, the weld-forming trolley which performs this function moving in synchronism with the spiral-forming trolley. The laser beam is directed along the interior of trolley guide 68 and is redirected and focused through the opening 68b which is at the bottom of the trolley guide all along its length onto the overlapping edge regions of the spiral at the bottom of the pipe where welding is desired.

It is to be understood that, although not shown in the drawing, supply roll 41 is held under tension as ribbon 42 is drawn away from it so that no slack develops. Toward this end a spring tension is provided in a direction opposite to that of arrow 43. As will be described below, the spiral-forming trolley actually forces ribbon 52 to move through it at the rate required to form the spiral. Since both trolleys move from right to left, the ribbon which traverses the pipe at the start of the process is actually "used up". That is to say, the length of ribbon drawn off the roll 41 is less than the ribbon length required to form the spiral by the original length of ribbon inside the pipe. The length of ribbon which is thus used is of no concern. The spiral-forming trolley draws through it the amount of ribbon required to form the lining, and where the ribbon used is supplied from — from the supply roll, or from the original length of ribbon inside the pipe — is of no moment.

Before actually lining the pipe with the metal ribbon, it may be desirable to grind its internal walls at least to the extent of eliminating large burrs or imperfections which might otherwise tear or deform the metal ribbon as it is forced against the wall of the pipe during the lining process.

Figure 4:
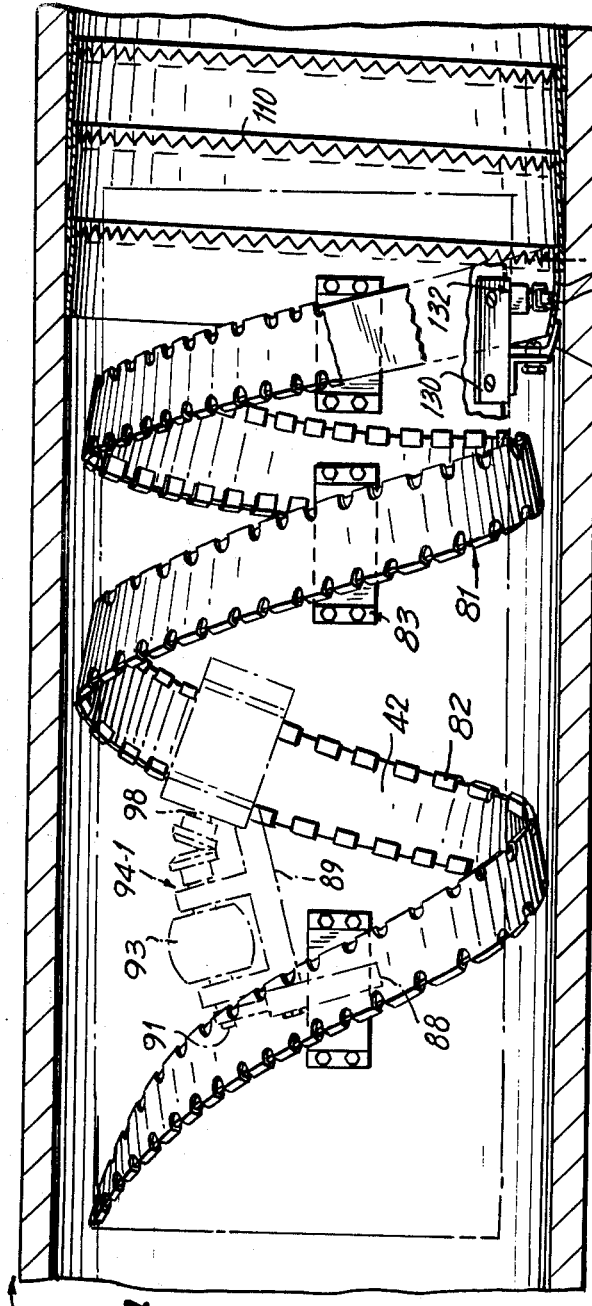
FIG. 4 is a longitudinal sectional view through the pipe showing how the ribbon is formed into a spiral lining, the spiral-forming trolley, which actually forms the spiral, being for the most part omitted in FIG. 4 for the sake of clarity.
Figure 5:
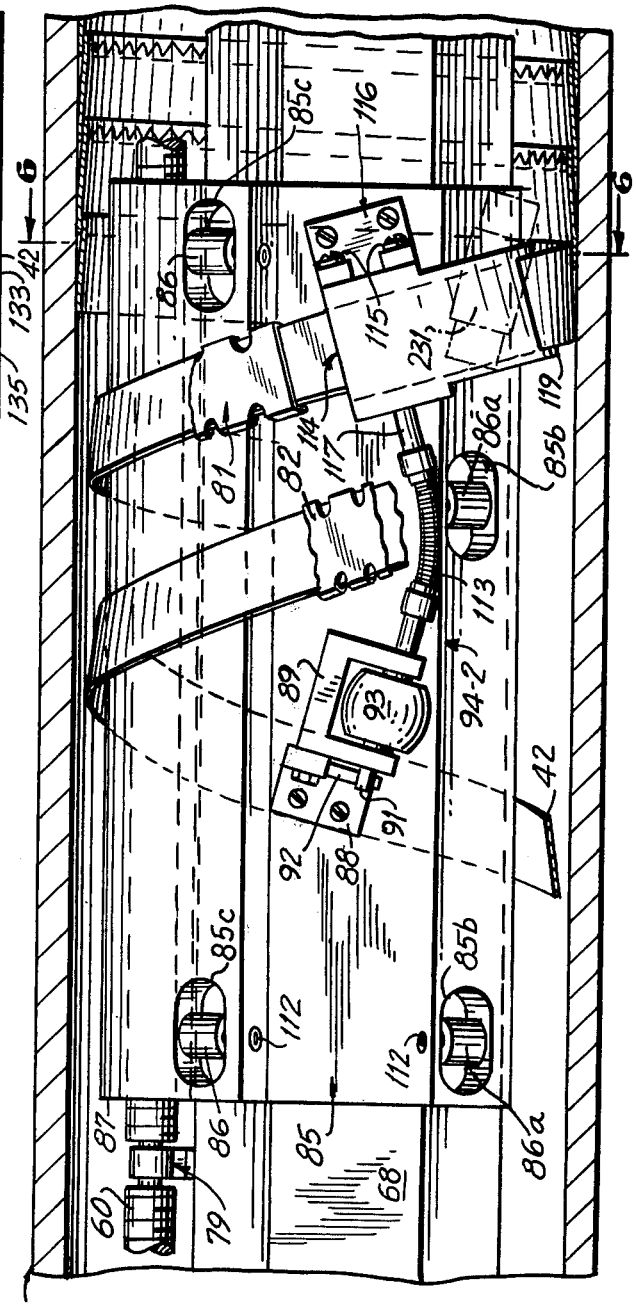
FIG. 5 is a view similar to that of FIG. 4 in which the spiral-forming trolley is shown, but with the ribbon and its guide shown partially broken away for the sake of clarity.

Different aspects of the spiral-forming trolley are shown in FIGS. 3–7. As is especially apparent in FIGS. 3 and 6, the weld-forming trolley, which moves along the inside of trolley guide 68, has been omitted for the sake of clarity. The spiral-forming trolley 85 conforms in interior cross-section to the general shape of trolley guide 68. At each end of trolley 85 there are four rollers 86, 86a as shown most clearly in FIGS. 3, 5 and 6. Each roller 86, 86a is mounted on a shaft 112. Each shaft is contained in a slot 85b, 85c formed in trolley 85 for placement therein of the rollers 86, 86a as shown most clearly in FIG. 5. The eight rollers 86, 86a simply serve to position trolley 85 on guide 68 for smooth movement from one end of the pipe to the other. Four of the rollers 86, 86a are positioned at the left of trolley 85. As shown in FIGS. 5 and 6, at the right end of the trolley, two upper rollers 86 are provided and two lower rollers 86a are displaced slightly to the left so as not to interfere with the laying down of the metal ribbon against the interior wall of the pipe.

Worm gear 60 traverses the length of the apparatus between support blocks 48a, 48b, the worm gear being disposed directly above trolley guide 68. To control movement of the trolley 86 along the axial or longitudinal direction of the pipe, all that is required is to provide a worm follower on the trolley through which the worm gear passes; the turning of the worm gear thus causes linear motion of the trolley. However, since the pipe to be lined may be many feet long, it is not desirable to allow the worm gear to remain unsupported between the two ends of the apparatus. For this reason, the worm gear is supported at intervals along its length by supports 79 secured to the top of trolley guide 68. With such supports, the worm gear and the worm follower must be designed such that the trolley can move all along the trolley guide from one end of the pipe to the other without any interferences with the supports. (A similar arrangement is required for the worm gear which controls the linear motion of the weld-forming trolley, as will be described below.)

The upper section of trolley 85, as shown in FIGS. 3 and 6, has a worm follower 87 through which the worm gear 60 passes. This worm follower 87 is open through an angle of approximately 90°, the opening being at the bottom. It is not necessary that the worm follower 87 extend fully from one end of the trolley to the other. It is sufficient only that the worm follower 87 always engage the worm gear.

On top of trolley guide 68, at locations which may be spaced, for example, at a separation of two feet, is the series of supports 79. As seen most clearly in FIG. 6, each support carries an internal bearing 80. Worm gear 60 has two different diameters, as seen most clearly to the left of FIG. 5. For the most part, the worm gear has a larger diameter which meshes with the worm follower 87 fixed to trolley 85. However, whenever the worm gear is supported in the bearing of one of supports 79, it has a smaller (smooth) diameter. The opening in the bottom of worm follower 87 allows trolley 85 to pass the leg 79a on each support 79 without interfering with it. The external diameter of each support is smaller than the internal diameter of worm follower 87 so that there is no interference with the motion of the trolley by the worm supports 79. Although the worm follower 87 does not engage the worm gear 60 along the reduced-diameter sections of the worm gear, this is of no moment provided that the length of the worm follower 87 is sufficient to bridge each small-diameter section of the worm gear. Thus as the worm follower passes over each support 79, since at all times the worm follower makes contact with the larger diameter portion of the worm gear, there is an uninterrupted smooth linear motion of the trolley as the worm gear rotates.

Worm gear 60 is reversible because motor 50 in FIG. 1 is reversible. Thus when the pipe is rotated in one direction, the two trolleys move from right to left, and when the pipe is rotated in the other direction, the two trolleys move from left to right. When the spiral-forming trolley 85 need not move, sprocket 58 (FIG. 1) is loosened on its shaft so that it does not drive worm gear 60.

As trolley 85 moves from right to left in FIGS. 4 and 5, the straight ribbon 42 coming in at the left end of the pipe is shaped into a spiral form for lay-down at the right end of the trolley. The pitch of the spiral formed around the trolley continuously decreases until at the point of lay-down there is an overlapping edge region which overlays the edge region of the adjacent previously laid out turn of ribbon. For proper formation of the lining spiral, two things are necessary. First, the incoming ribbon must be gradually shaped from a straight form to a spiral of the pitch required for the lining. Second, there must be a positive drive which pulls the ribbon into the trolley and forces it out at the bottom of the pipe into intimate contact with the adjacent previously laid turn, with both turns being forced firmly down against the pipe in the edge regions where welding is to take place.

The gradual shaping of the ribbon is effected by providing a ribbon guide 81 fixed to trolley 85 whose configuration is shown most clearly in FIG. 4. This guide has its forward (left) and extending not quite out to the left end of the trolley, and then winds around the trolley with a constantly decreasing pitch. The ribbon guide 81 is secured by a plurality of brackets 83 to the outside of trolley 85. The internal face of ribbon guide 81 has a series of bent tabs 82 which loosely retain ribbon 42 as shown in FIGS. 4, 5 and 6. The ribbon guide terminates, as shown in FIG. 6, at a point just above mechanism 94-2, this mechanism serving to force out the ribbon and lay it down at the bottom of the pipe, as will be described below.

In FIG. 4, part of the already welded spiral is shown; the weld is "sawtooth-shaped" as shown by the numeral 110. It is the oscillation of the mirror to be described below in connection with the weld-forming trolley that produces the sawtooth weld. After the sawtooth weld is formed, a linear spiral weld is formed as shown by the numeral 111 in FIG. 4a. This linear weld is essentially along the center line of the sawtooth-shaped weld pattern, and the reason for this second weld will also be described below. For present purposes, it is sufficient to note that the second weld line may be formed very simply. After the pipe is rotated in one direction as the two trolleys move from right to left, the motor direction is reversed so that the pipe rotates in the opposite direction, the worm gear 60 is disengaged from the chain 56 by loosening sprocket 58, and the weld-forming trolley moves from left to right when the motor 50 is activated. At this time, by disabling the oscillation of the mirror on the weld-forming trolley, there is formed a linear weld 111 as shown in FIG. 4a. (During the reverse travel, the spiral-forming trolley would serve no function.)

It is important to note that if the interior wall of the pipe is to be completely lined automatically by the apparatus of the invention with a single continuous strip, the pitch of the spiral lining should not be too great. If the pitch is too great, the spiral turns may not have overlapping edge regions as desired. In order to properly line the end of the pipe, the spiral-forming trolley should be positioned initially such that at the bottom of the pipe, the near edge of the ribbon intersects the edge region of the pipe where the lining is to commence. In other words, as the first turn of the spiral is formed, most of the turn may be outside the pipe. In this way, and if the pitch of the spiral is small enough to insure that the first turn properly lines the end region of the pipe, there will be no unprotected portion of the pipe at the right end. Of course, with the first turn of the spiral being partially beyond the end region of the pipe where the lining portion is to commence, it is necessary to cut off the undesired portion of the first turn at the end of the lining operation, but this can be done manually. Similar remarks apply to the left end of the pipe. The spiral must continue to be formed, even though part of it may extend out of the left end of the pipe, until the pipe is lined at its left end up to the end region where the lining is to terminate. Short resistant metal sections or rings may first be welded to the pipe ends — a step which may be necessary in the first place if these sections include flanges for attaching the lined pipe to a vessel, for example, or the ends of the pipe can be "buttered" with resistant metal (as will be described below). With such (resistant metal) ends it is not necessary for the lining to completely cover the inside wall at each end to properly line the pipe; thus, there may be no need to cut lining at the ends of the pipe. Such an arrangement will be described below in connection with FIG. 23.

Near the left end of trolley 85 there is a ribbon-feed mechanism 94-1. The mechanism, shown in phantom in FIG. 4, serves to positively draw the ribbon into the trolley at a sufficient rate for forming the spiral. Ribbon-feed mechanism 94-1 actually is capable of drawing in the ribbon at a rate slightly in excess of that required for forming the spiral. Similarly, mechanism 94-2, to be described below, is capable of forcing ribbon out at the bottom of the pipe at a rate greater than that required to form the spiral. In both cases, the ribbon-feed mechanisms are capable of slipping slightly over the ribbon, when, respectively, the guide 81 is "filled" with ribbon 42 and the ribbon is positioned properly against the edge region of the overlapped previously laid turn at the bottom of the pipe with bottom edge regions pressed firmly against the pipe. Although the rate at which mechanism 94-2 attempts to drive out ribbon is greater than the rate necessary, only enough ribbon can actually be fed out of the mechanism as is required to form the spiral due to the inherent stiffness of the ribbon and the various retaining means provided. The drive roller in the mechanism simply slips a little over the ribbon when necessary, as will become apparent below. Since it is almost impossible without this "overdrive" feature to feed out the ribbon at exactly the rate required to form a spiral — with the ribbon in intimate contact with the interior wall of the pipe — the feed mechanism is designed to potentially feed out too much ribbon with the ribbon being prevented by other means from actually feeding out too rapidly; only enough ribbon is fed out as is in fact required to properly form the spiral. Similarly, mechanism 94-1 draws the ribbon into and pushes it through guide 81. Mechanism 94-1 is capable of drawing in and pushing through the ribbon at a rate faster than is required to form the spiral. All that happens when the ribbon is overdrawn is that the ribbon expands outwardly within and "fills" guide 81 so that any slack within the guide is taken up. Thereafter, the drive roller in mechanism 94-1 which bears against the ribbon and draws it in simply slips on the ribbon since no more ribbon can be drawn into guide 81 than is fed out from it.

As shown most clearly in FIGS. 3, 4 and 13–16, ribbon-feed mechanism 94-1 includes a bracket 89 on which there are mounted two shafts 91 and 98. The two shafts terminate in bevel gears 95, 96 which mesh with each other. A rubber-covered roller 93 is mounted on shaft 91 and bears against the inside wall of the pipe 40. Another roller 97 is secured on shaft 98. Ribbon 42 moves between roller 97 and another roller 101 within bracket 89. Roller 97 forces ribbon 42 through the mechanism, the speed at which the ribbon is pulled being a function of the pipe rotational speed since the drive for the ribbon is from roller 93 which bears against the inside wall of the pipe. The feed mechanism is not connected to guide 81 as seen most clearly in FIG. 16; this is important because when there is no ribbon in the trolley, the feed mechanism may have to be rotated out of the way as will be described.

Figure 14:
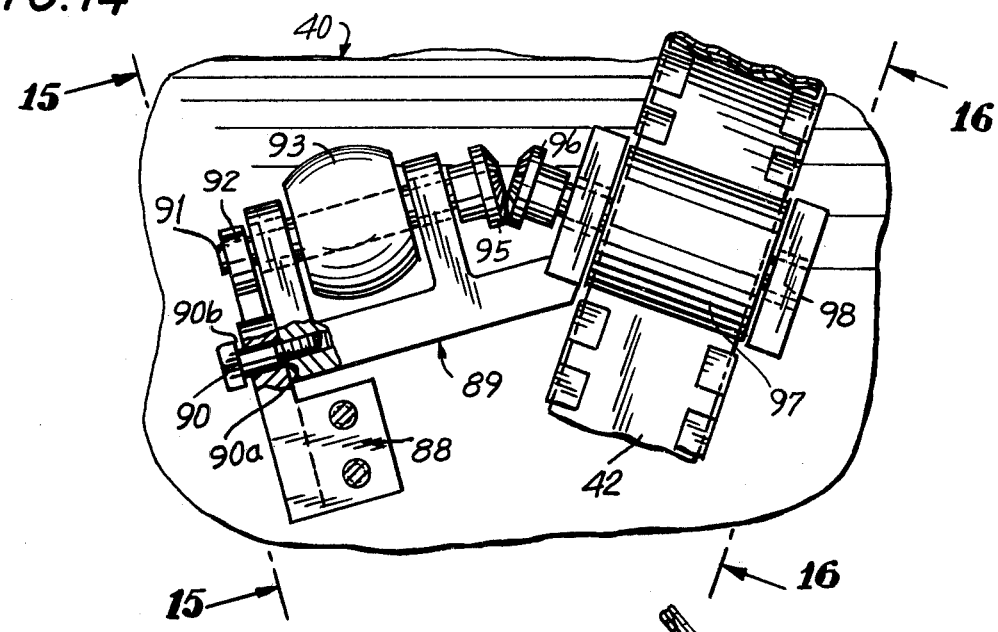
FIG. 14 is a side view showing the mechanism of FIG. 13.

It will be noted in FIGS. 4 and 14 that shaft 91 is at an angle with the axis of the pipe, and that shaft 98 is inclined in the opposite direction. The actual surface speed of roller 93 depends upon its angle of inclination, the speed of rotation of the pipe and also the speed at which the trolley is moved along the pipe, since a component of the surface speed of the roller is contributed by the axial speed of the trolley. Although there are several component contributions to the roller motion, all that is required to insure a proper drive speed for the ribbon is to select a proper diameter for roller 93.

Figure 15:
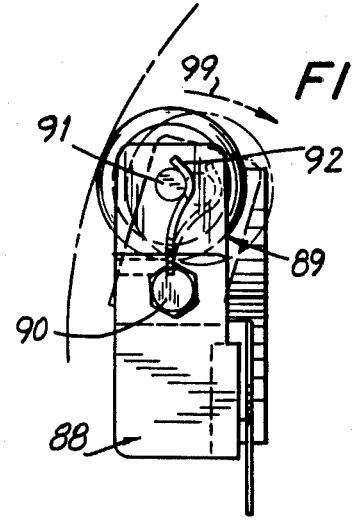
FIG. 15 is a sectional view taken along line 15—15 in FIG. 14.
Figure 16:
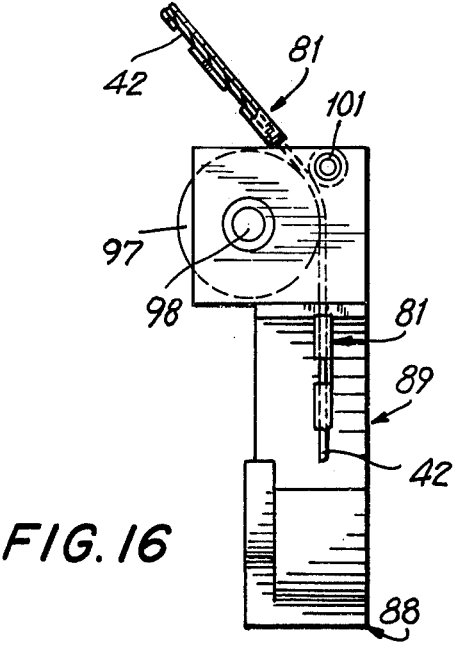
FIG. 16 is a sectional view taken along line 16—16 in FIG. 14.

Although it is convenient to pick off the drive for the ribbon from the rotating pipe itself, preferably roller 93 should not bear against the lined pipe as the trolley 85 is moved after the spiral has been formed and welded. This is especially true when the trolley guide and worm gear assembly is being inserted into a pipe preceding its lining; should roller 93 bear against the pipe, it may be difficult to insert the assembly. For this reason, bracket 89 is not secured directly to trolley 85. Instead bracket 89 is mounted by bolt 90 to a second bracket 88, it being bracket 88 which is secured to trolley 85, as shown in FIGS. 14 and 15. When bolt 90 is loosened bracket 89 may rotate around the bolt axis. To assure that when the bracket rotates toward the pipe wall the roller 93 bears against the pipe wall, a leaf spring 92, extending out of bracket 88, bears against shaft 91 as shown most clearly in FIGS. 14 and 15. The spring biases shaft 91 against the pipe wall, thus rotating bracket 89 in the direction toward the pipe wall.

In order to disengage roller 93 from the pipe wall, bolt 90 is tightened. Shoulder 90a first engages bracket 89 and causes the bracket to rotate with the bolt — away from the pipe wall as shown by arrow 99 in FIG. 15. As the bolt is turned somewhat further, shoulder 90b bracket 88 and is tightened against it. (A lock washer may be provided to insure that the bolt remains tightened.) Thus in the tightened position of the bolt, bracket 89 is held away from the pipe wall against the force of spring 92, as shown by the phantom lines in FIG. 15.

The second ribbon-feed mechanism 94-2 is provided at the right end of trolley 85, this mechanism serving to feed out the ribbon into intimate contact with the adjacent previously laid turn, and press both turns against the bottom of the pipe. As shown in FIGS. 5 and 6, guide 81 terminates at a point just above mechanism 94-2. Guide 81 is not connected to the ribbon-feed mechanism because the mechanism is capable of being positioned inwardly away from the pipe wall when it is desired to move the trolley without laying any ribbon.

As shown in FIG. 5, the drive pick-up for the ribbon-feed mechanism 94-2 includes a pair of brackets 88 and 89, a roller 93 and a spring 92. Thus the drive for the ribbon is picked up from the rotating pipe as in the case of ribbon-feed mechanism 94-1. The difference between mechanisms 94-1 and 94-2 resides in the fact that in the latter there is a flexible coupling 113 extending from shaft 91 to the roller 118 in guide plate 114 which actually bears against the ribbon and provides its feed in order to minimize the overall dimensions of the strip-laying trolley 85 so that it can fit within pipes of smaller diameters.

Mechanism 94-2 consists of a bracket 116 secured to trolley 85, and guide plate 114. The guide plate has two side flanges which support shaft 117 of roller 118. Two slots are provided on each side of bracket 116. Two bolts 115 extend through the slots on each side of bracket 116 and holes in plate 114. When these bolts are loosened, guide plate 114 may be pushed away from the wall of the pipe toward bracket 116 and then tightened in place. This is done prior to insertion of the trolley 85 inside a pipe before it is lined so that guide plate 114 does not scrape against the pipe. When a new pipe is to be lined, bolts 115 are loosened, guide plate 114 is pushed toward the wall of the pipe as shown in FIG. 6, and bolts 115 are then tightened.

Guide plate 114 is provided with a foot 119 which guides the ribbon 42 in the proper orientation for lay-down against the pipe, with one edge region of the ribbon overlapping the edge region of the adjacent previously formed turn. The foot is also provided with an internal slot 120 out of which ribbon 42 emerges against the pipe. The ribbon is forced through the guide plate by the turning of roller 118 which bears against the ribbon.

It is important that the ribbon fed out from guide plate 114 be optimally positioned to effect a weld. Toward this end, the ribbon is flexed as shown most clearly in FIGS. 6 and 7. Secured to the underside of trolley 85 is a bracket 130 which supports both a bracket 131 and an assembly 132. The bracket 131 has secured to it by a bolt 136 a guide element 135. Referring to FIGS. 6 and 7, it will be noted that the position of strip 42 in the horizontal direction is determined by guide plate 114, and the strip leaves the guide plate bearing down towards the pipe wall with the right edge region of the strip pressed into intimate contact with the edge region of the previously laid turn (both edge regions being pressed against the pipe). The left edge of the ribbon is lifted by guide element 135 while at the same time assembly 132 applies pressure to the center of the strip so that the center is flexed downward slightly as shown in FIG. 7. Assembly 132 includes three shafts 138 each of which terminates in a roller support 137. The support is biased downwardly by a spring 139, and a roller 133 is mounted at the bottom of the support. The three rollers bear down on the center of the strip and together with guide 135 flex the ribbon. The reason for flexing the ribbon in this way is that it assures that the right edge region of the ribbon bears down in intimate contact with the edge of the previously laid turn 42', and both are pressed against the pipe wall, so that a good weld may be formed. The rollers 133 also act to prevent kinking of the ribbon as the result of possible overdrive by ribbon-feed mechanism 94-2. The laser beam is directed along line 140 in FIG. 7 located in the overlapping edge regions of the strip where the weld will be made as will be described below. The positions of guide 135 and rollers 133 relative to the formation of the lining are shown in FIG. 4.

Figure 17:
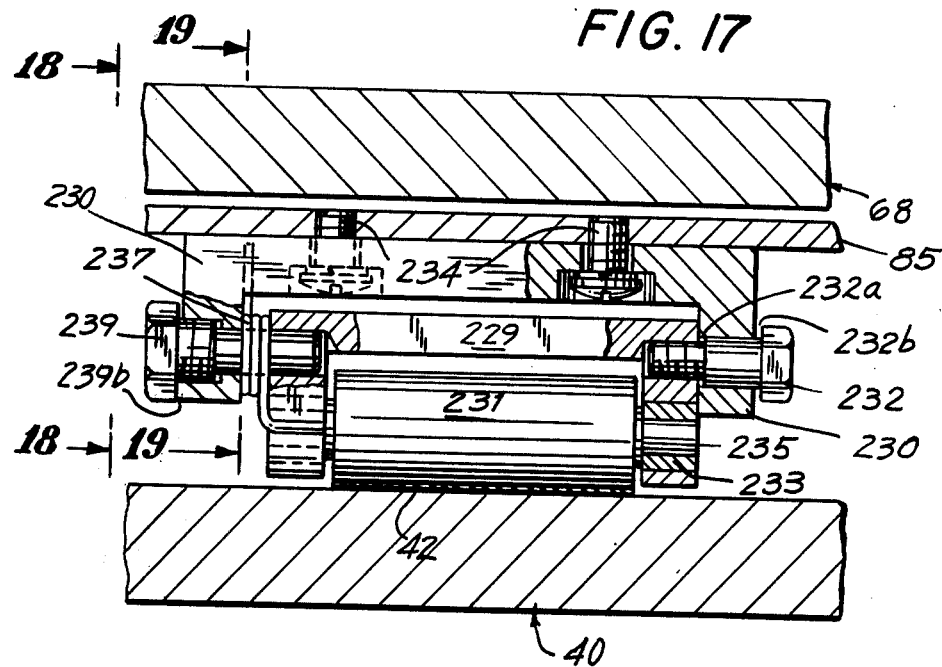
FIG. 17 is a sectional view taken along line 17—17 in FIG. 6.
Figure 18:
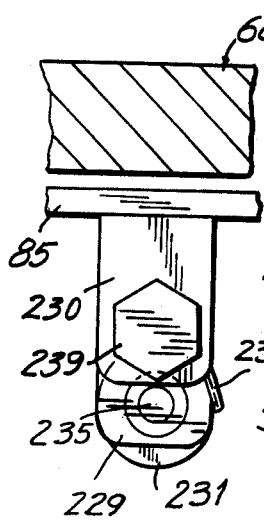
FIG. 18 is a sectional view taken along line 18—18 in FIG. 17.
Figure 19:
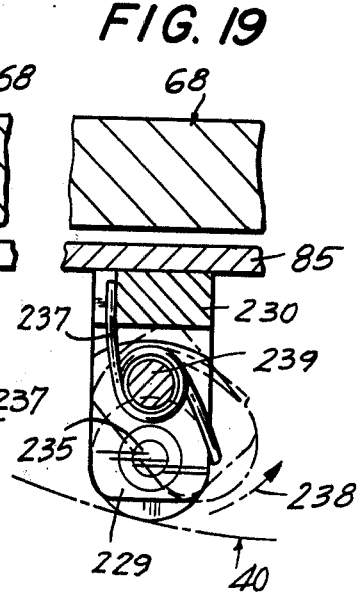
FIG. 19 is a sectional view taken along line 19—19 in FIG. 17.

An additional roller 231 is provided in order to further assure that the ribbon being laid down is held tightly against the pipe and does not shift out of the proper position due to the flexing of the ribbon. The relative position of the roller is seen most clearly in FIG. 6, but the mounting of the roller will become most clear upon consideration of FIGS. 17–19. The roller, shown bearing against ribbon 42, is mounted on a shaft 235; the shaft is supported by bearings 233 contained in bracket 229. This bracket is, in turn, mounted by two bolts 232, 239 to another bracket 230. Bracket 230 is secured by two screws 234 to the underside of trolley 85. Bracket 229, together with the roller, can thus rotate around the axis of bolts 232, 239. As shown in FIGS. 17 and 19, a spring 237 is secured at one end to bracket 230, and at the other end bears against bracket 229 to bias it in a direction such that roller 231 bears against the strip 42 and presses it firmly against the pipe. With the bolt 232 loosened, the spring biases the roller to the position shown in FIGS. 17 and 18. This is the operative position as the spiral lining is being formed. But when it is desired to retract the assembly from within the pipe, the bolt 232 is rotated. Shoulder 232a engages bracket 229 and rotates it out of position against the force of the bias spring, the bracket moving in the direction of arrow 238 in FIG. 19 to the position shown in phantom. As the bolt is tightened still further, shoulder 232b bears against bracket 230 and locks the bracket in position. This arrangement is related to that used to control the positions of the ribbon-feed mechanisms (see FIGS. 14 and 15).

When it is desired to erect the apparatus for pipe removal or emplacement, the trolley 85 is withdrawn to the extreme left end of the apparatus so that it rests against element 78 of support block 48a prior to such erection.

Figure 8:
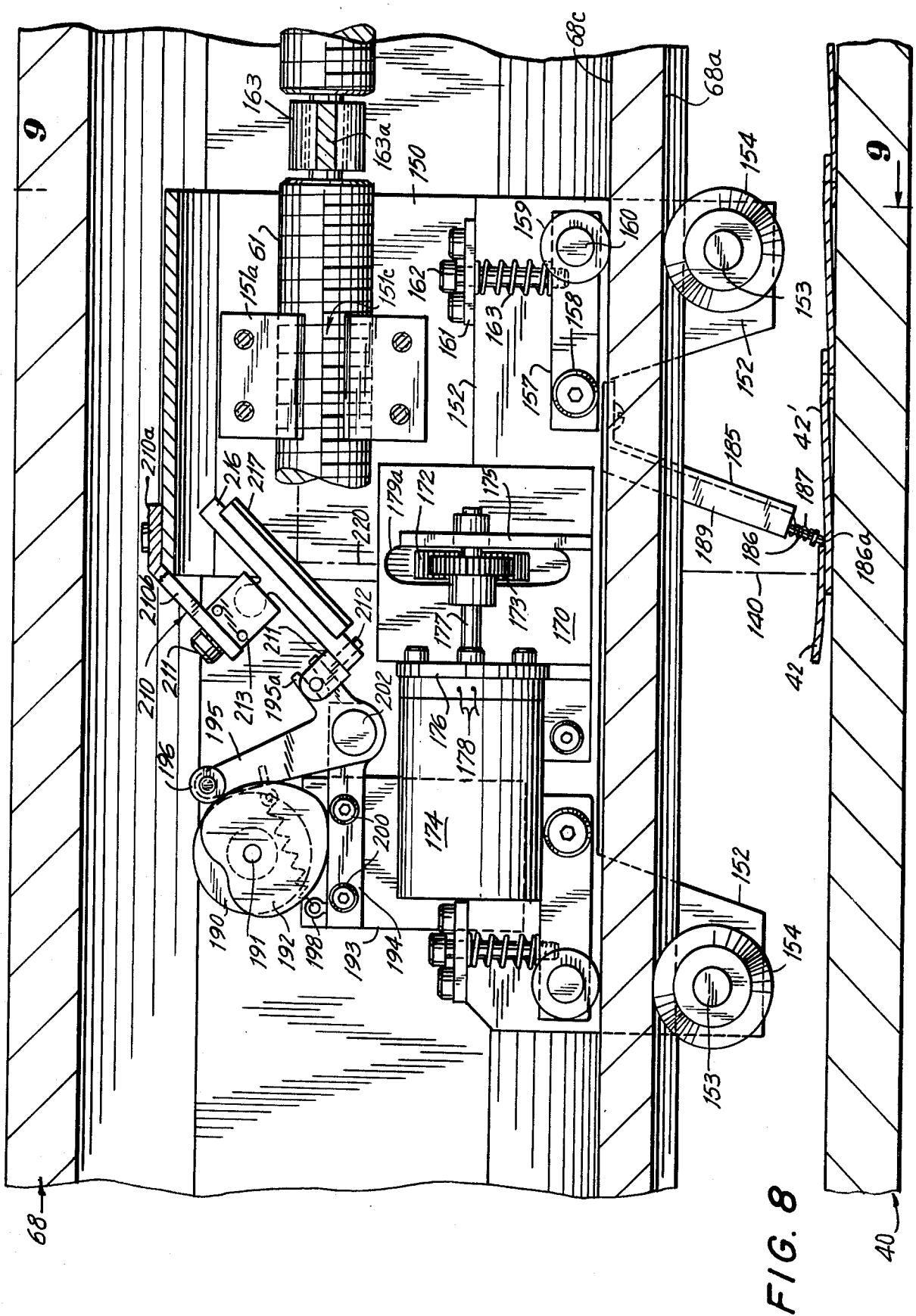
FIG. 8 is a sectional view through the pipe showing only the weld-forming trolley.

The weld-forming trolley 150, and certain sub-assemblies in it, are shown in FIGS. 8–12. FIG. 8 is a longitudinal sectional view of the trolley, FIG. 9 is a cross-sectional view through trolley guide 68 and the weld-forming trolley which moves largely within it, and FIG. 10 is a top view taken along line 10—10 in FIG. 9. The exterior portion of the trolley within the guide has the general shape of an octagon, as seen most clearly in FIG. 9. The trolley moves along guide 68, the trolley having wheels which ride along precision bottom surfaces of the trolley guide, as seen most clearly in FIGS. 8 and 9.

At the right end of the trolley in FIG. 8, there is a depending leg 152 which extends down through the opening 68b along the bottom of guide 68. Extending through leg 152 is a shaft 153 (supported by bearings, not shown), and two wheels 154, 155 are mounted on the ends of the shaft. Wheel 155 bears against the undersurface of the precision-formed bottom section 68d of the trolley guide, and V-shaped guide wheel 154 moves within precision-formed axial groove 68a on the underside of the trolley guide. The groove 68a and the guide wheel 154 insure that the trolley 150 is held centered within the guide as it moves from one end to the other. A comparable leg 152 and wheels 154, 155 are provided at the other (left) end of the trolley, as seen most clearly in FIG. 8. (Wheels 155 are not V-shaped and do not ride in guide grooves. Such wheels at each side of the trolley might give rise to "binding", i.e., a "jerky" travel of the trolley.)

Figure 12:
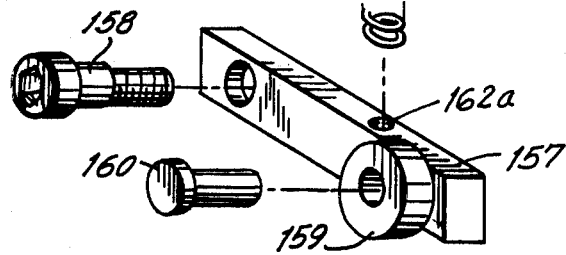
FIG. 12 is an exploded perspective view of a subassembly in the weld-forming trolley.
Figure 13:
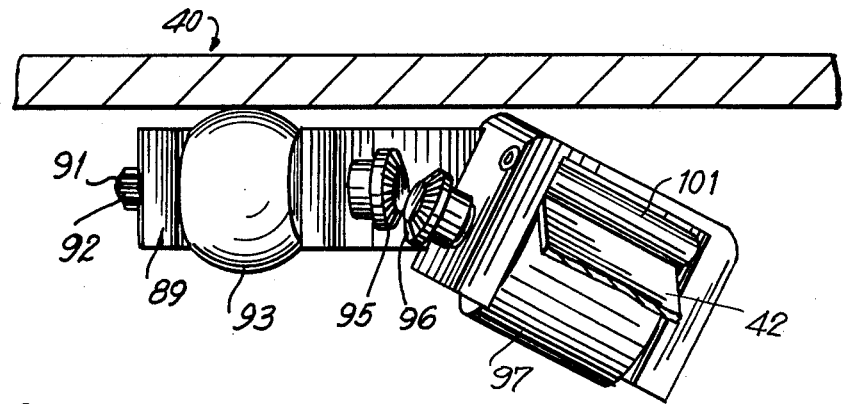
FIG. 13 is a view taken along line 13—13 in FIG. 3 and depicts a top view of one of the mechanisms on the spiral-forming trolley which draws the ribbons into the rotating pipe.

Leg 152 also extends upward as seen most clearly in FIGS. 8 and 10. On each side of the upward extension, a bar 157 is pivoted by a bolt 158. (An exploded view of the sub-assembly under consideration is shown in FIG. 12, which should be considered along with FIGS. 8–10.) At the other end of each of bars 157, a wheel 159 is pinned by a bolt 160. Thus each of bars 157, with a wheel 159 at one end, can rotate around a bolt 158 which is extended through the other end.

Each of wheels 159 (there are two such wheels at the right end of the trolley in FIG. 8, and two such wheels at the left end) bears down on a flat horizontal section 68c of the trolley guide, as seen most clearly in FIG. 9. In order to minimize vertical movement of trolley 150, all of wheels 159 are pushed downwardly. As seen most clearly in FIGS. 8 and 12, a plate 161 is secured on top of each of legs 152, with plate 161 extending out past the two sides of the leg. A pin 162 is positioned on each side of an overhanging plate 161, extending down through the plate to the top of a respective bar 157 near the end of which wheel 159 is mounted. A spring 163 is provided on each pin 162. This spring forces downwardly that end of bar 157 which supports wheel 159, the bar rotating about bolt 158. Consequently, the two wheels 159 on each side of a leg 152 are biased toward respective wheels 154, 155. This arrangement allows smooth movement of trolley 150 along the inside of the trolley guide, with minimal up-and-down motion, even though surfaces 68c of the trolley guide may not be precision formed.

The axial movement of the trolley is controlled by worm gear 61. The arrangement for supporting the worm gear inside the trolley guide is similar to that employed in connection with worm gear 60. As seen in FIGS. 8–10, the diameter of the worm gear is reduced, approximately every two feet or so. Each reduced-diameter smooth section of the worm gear is supported by a bearing 164 contained in a support 163, the various supports being bolted to an inner side of trolley guide 68 at intervals of approximately two feet. Trolley 150 includes a worm follower 151. The worm follower 151 is mounted in a support block 151a secured to an inner side of the trolley guide 68. The worm follower is open as shown by the numeral 151b, so that the worm follower can pass over the supporting leg 163a of each bracket 163; this is shown most clearly in FIG. 9. The worm follower must have a length (see FIG. 8) longer than each smaller-diameter section of the worm gear. Referring to FIG. 8, it will be noted that provided worm follower 151 is long enough, it will always engage a larger diameter portion of worm gear 61, even as the worm follower passes over a supporting bracket 163.

Referring to FIG. 8, the laser beam is directed towards the trolley from the right end and is reflected downward by mirror 217 along dashed line 220. The laser beam then passes through the focusing apparatus 170 down along line 140 in FIG. 8 onto the strip 42 where the laser beam welds together the overlapping edge regions of two turns. As will be described below, when mirror 217 is oscillated, the focused laser beam is moved left and right along strip 42 in FIG. 8. Since the metal ribbon which is being laid down against the bottom of the pipe moves in a direction essentially perpendicular to the plane of FIG. 8, it is apparent that the sawtooth-shaped weld described above is formed. The mirror is positioned on the mirror assembly at a slight tilt as shown most clearly in FIG. 8 so that the effect of the pitch of the lining strip is compensated for when a sawtooth pattern at a constant weld speed along the lining is desired.

It is desirable that the spot size of the focused beam on the ribbon 42 remain relatively constant for the most reliable weld; once the spot size (power density) is selected for a particular system, it should remain as constant as possible for a given laser power. Unfortunately, there may be minor variations in the shape of a pipe to be lined and this could otherwise necessarily change the spot size on the ribbon. To compensate for such variations, the lens 180 of the optical system 170 is moved up and down in accordance with the location of the section of the pipe being lined.

Referring to FIGS. 8–10, the optical assembly 170 consists of an open cylinder 179 secured to trolley frame 150, and a cylindrical lens holder 171, for supporting a lens 180, which is mounted for axial movement within cylinder 179. Cylinder 179 includes a vertical cut-out 179a on one side thereof, as shown most clearly in FIGS. 8 and 9. A rack 172 moves up and down within cut-out 179a. The rack is secured to lens holder 171 by screws 181. (Holes 179b in cylinder 179, and comparable holes in lens holder 171, are provided solely so that during fabrication, access to screws 181 may be had to secure rack 172 to the lens holder.) Pinion 173, mounted on shaft 177 of motor 174, meshes with rack 172; as the motor shaft turns, lens holder 171 and lens 180 are moved in correspondence either up or down within cylinder 179. A control signal for motor 174 is applied to conductors 178 (FIG. 8), in accordance with the location of the pipe section which is being lined.

The location of the pipe section is sensed by finger 186, shown most clearly in FIGS. 8 and 9. This finger is part of linear precision potentiometer 189 which is mounted in bracket 185 secured to the underside of trolley 150. Spring 187 forces finger 186 downward against an already laid turn 42' on top of one of whose edge regions the new turn is being formed. The further from the focusing lens 188 is the pipe section being lined, the further downward finger 186 moves under the force of spring 187. The potentiometer is connected to a circuit to be described below which develops the control signal for motor 174. The greater the distance that finger 186 extends out of bracket 185, the further from the focusing lens is the pipe. This, in turn, controls the generation of a control signal which rotates shaft 177 in a direction for causing lens 180 to move downward in the trolley. Conversely, if the pipe is too close to the focusing lens 180, a control signal is generated that results in lens 180 being moved upward by motor 174. In either case, the lens position is adjusted so as to maintain the spot size constant at the weld point. This refocusing of the laser beam, while not absolutely necessary, is preferred in that it contributes to the integrity of the weld. (Instead of using a potentiometer, other sensors such as a linear variable differential transformer may be utilized; such a device has a resolution measured in microinches.)

The electronic circuit which derives the control signal for motor 174 from potentiometer 187 may be carried by the trolley itself. For example, the circuit may be placed on top of trolley 150, there being ample room for this as is apparent from an inspection of FIG. 9. Power for the circuit may be derived from an electric cable provided for this purpose at the left end of the apparatus of FIG. 1 and extended along the center of trolley guide 68 to trolley 150. Preferably, the cable may be wound on a reel which automatically retracts the cable slack as the trolley moves from right to left in FIG. 1. Alternatively, the potentiometer and motor leads may be bundled together in a comparable cable, with the electronic circuit not being carried by trolley 150 but being contained external to the apparatus. It is also possible to mount a power source, e.g., batteries, along with the electronic circuit on trolley 150, in which case there is no need for a retractable cable at all. Similar remarks apply to motor 190 (and leads 188, as shown in FIG. 9) for controlling the oscillation of the mirror now to be described. Such power supply means could also be used to operate motors to drive the strip through the spiral-forming trolley 85 instead of deriving power for this purpose from the rotation of the pipe as previously described.

Figure 11:
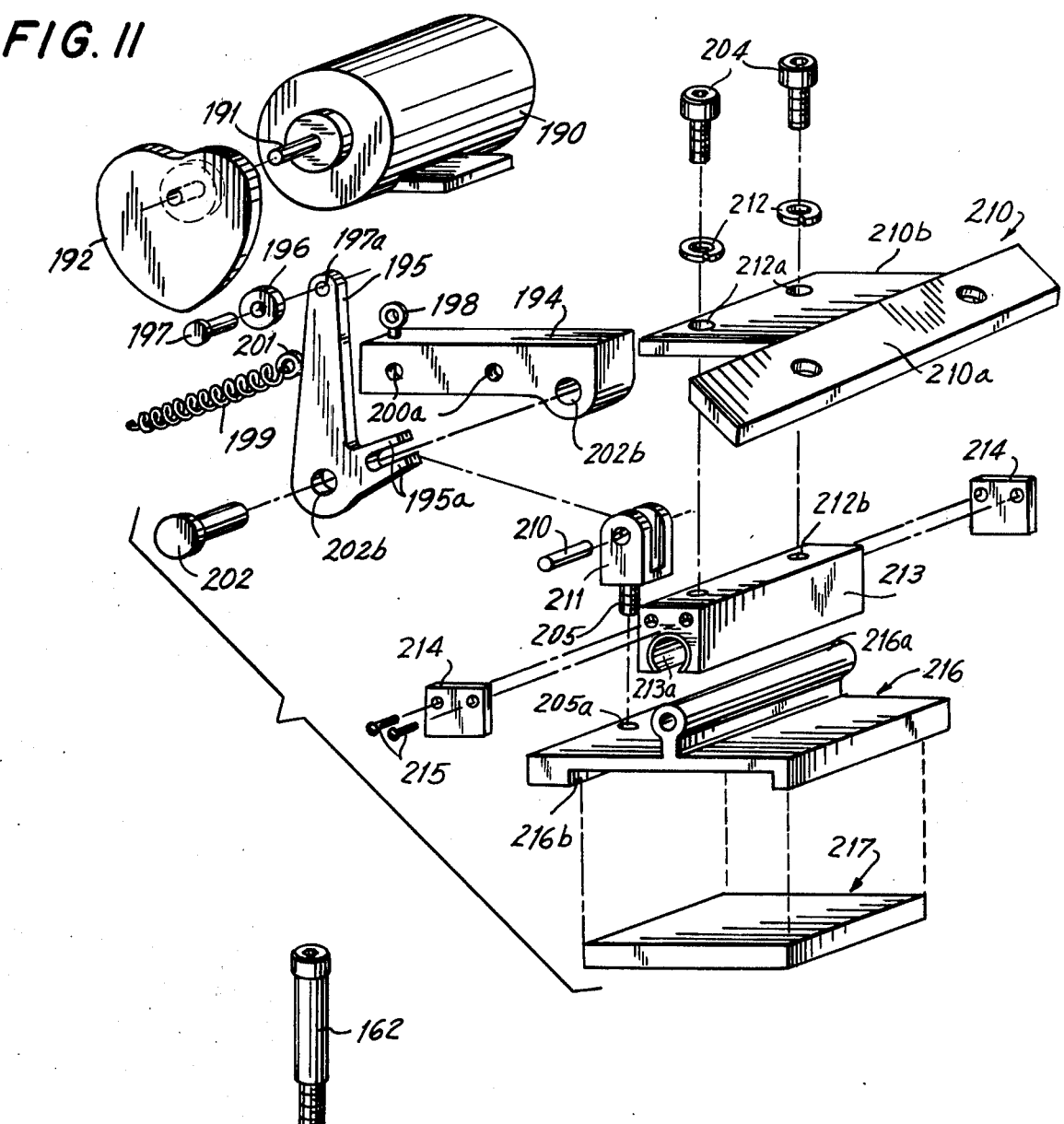
FIG. 11 is an exploded perspective view of the mechanism on the weld-forming trolley which controls the mirror motion.

The mirror mount, and the mechanism for oscillating the mirror, are shown in FIGS. 8–10, and in exploded form in FIG. 11. (Referring to FIG. 8, it will be seen that section 210a of bracket 210 is horizontal with section 210b being inclined. Exactly the reverse is shown in FIG. 11. The shift in orientation shown in FIG. 11 is only so that the complete drawing may be included within the confines of the sheet.) Bracket 210a is mounted at the top of trolley 150. Screws 204 pass through washers 212 and two holes 212a in bracket 210 for engaging screw holes 212b in block 213. This is the block which holds mirror mount 216.

The mirror mount includes a partially cylindrical ridge 216a which is mounted within the open cylindrical bearing material 213a in block 213. Mirror mount 216 can thus rotate around the axis of ridge 216a within block 213. In assembling the unit, ridge 216a can be inserted at either end of block 213; thereafter, end plates 214 are secured by screws 215 to the ends of block 213 to fix mirror mount 216 within the block. Mirror 217 is secured to the underside 216b of mirror mount 216. Referring to FIG. 8, it is apparent that as the mirror mount 216 oscillates back and forth slightly around the axis of ridge 216a, the line 140 along which the laser beam is focused moves to the left and the right to form a sawtooth-shaped weld.

Section 193 of the trolley extends upwardly from the left leg 152, as seen most clearly in FIG. 8. Attached to this upstanding section of the trolley is a bracket 194, secured by two bolts 200 which pass through a pair of holes 200a (FIG. 11) in bracket 194 to vertical section 193. At the left end of bracket 194 is a lug 198 to which one end of spring 199 is secured. The other end of the spring is secured to lug 201 on pivot element 195. A pin 202 is extended through hole 202b in pivot element 195 and is secured in hole 202b in bracket 194. This arrangement permits pivot element 195 to rock back and forth around the axis of pin 202, with the spring biasing the pivot element in the counter-clockwise direction. A cam follower 196 is secured to the upper end of pivot element 195 by pin 197 secured in hole 197a. The cam follower bears against heart-shaped cam 192 which is turned by shaft 191 of motor 190. The rotating cam causes pivot element 195 to rock back and forth around the axis of pin 202 in accordance with the cam shape. Spring 199 maintains cam follower 196 in contact with cam 192 at all times.

The other end of pivot element 195 has a pair of fingers 195a disposed between the two sides of bracket 211. A pin 210 extends between the two fingers and is secured in the bracket as shown. The bracket is fixed by its screw 205 to mirror mount 216, screw 205 being screwed into hole 205a on the mirror mount before pin 210 is extended through the sides of bracket 211 between fingers 195a. As pivot element 195 rocks back and forth around the axis of pin 202, as can be appreciated most clearly from FIG. 8, mirror mount 216 rocks back and forth around the axis of ridge 216a.

The particular shape for cam follower 192, in conjunction with the geometry of pivot element 195 and the mirror mounting, is such that the linear speed of the laser beam along the ribbon is constant. This insures that a uniform weld is formed. In the absence of a constant speed of the weld spot on the ribbon, different regions of each sawtooth-shaped section of the weld would be welded differently unless the laser power were varied corresponding to the change in speed of the weld spot. While not essential, it is preferable to provide a constant speed of spot travel along the weld line. (In the event of a variable spot speed, it is necessary to utilize a laser of sufficient power to insure that an adequate weld is made even when the weld spot moves at its faster speed or else to modulate the laser power to correspond to the changes in spot speed.)

As mentioned above, it is only necessary to weld the overlapping edge regions of successive turns to each other. It is not necessary to continuously weld the lining to the pipe itself. However, to insure that the lining does not shift within the pipe, it is desirable periodically to either cause the spot to dwell longer at a given location or else to apply a burst of increased laser energy so that the heat at the weld spot is sufficient not only to weld the overlapping edge regions of the ribbon together, but also to weld them to the underlying pipe that the ribbon is bearing against. It is sufficient to weld the lining to the pipe, for example, only five percent of the time, that is, one-tenth of an inch of the weld (in the direction of the spiral) may have the lining secured to the pipe, while the next two inches or so may simply have the overlapping edge regions of the ribbon welded to each other without the lining being welded to the pipe. The apparatus for controlling such a modulation of the power of the continuous laser beam may be independent of the pipe-rotating and lining forming apparatus as will be apparent to those skilled in the art. Of course, it is also possible to use a laser beam of sufficient energy such that all along the weld line, from one end of the pipe to the other, the lining is welded to the pipe.

Prior to erecting the apparatus for pipe removal or emplacement on the apparatus, the weld-forming trolley is moved to the left end of the apparatus so that it contacts element 78 of support block 48a and rests against it during the erection and lowering process.

Figure 22:
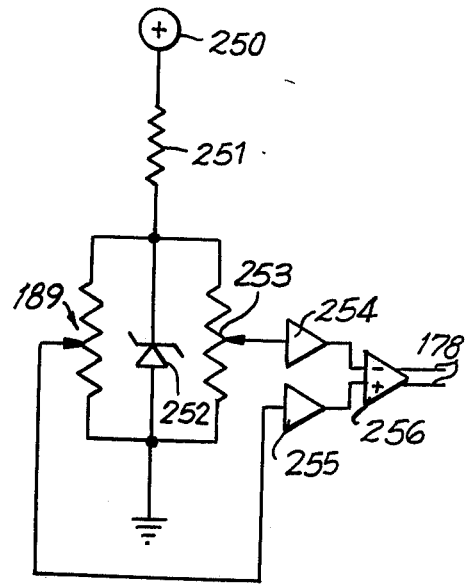
FIG. 22 depicts a circuit for controlling a constant weld spot size, even as the location of a pipe being lined varies slightly (as may be the case with some pipes) from the trolley guide.

The electrical circuit which is responsive to movements of potentiometer finger 196 to control the operation of motor 174, in order to keep the laser beam in focus at the point of weld independent of the pipe location, is shown in FIG. 22. Potential source 250 is connected in series with resistor 251 and zener diode 252 to ground. The voltage across the zener diode serves as a reference voltage for the circuit. The potentiometer 189 is connected across the zener diode. It is the tap on the potentiometer whose position is controlled in accordance with the motion of finger 186. The potentiometer tap is connected to a high input-impedance amplifier 255, whose output is connected to one (positive) input of difference amplifier 256. Potentiometer 253 is also connected across the zener diode and its tap is connected to high input impedance amplifier 254 whose output is connected to the other (negative) input of difference amplifier 256. Depending on the relative magnitudes of the two potentials at the potentiometer taps, a control signal is developed across conductors 178 (connected to the input of motor 174) by the difference amplifier 256.

The tap on potentiometer 253 is set in accordance with the nominal location of the pipe from the focusing lens 180 so that the laser beam will be focused as desired when finger 186 rides on a turn of the ribbon which bears against a section of the pipe whose location is the nominal location. Thereafter, as finger 186 moves in and out of potentiometer 189 (FIG. 8), the magnitude as well as the polarity of the signal across conductors 178 changes. The conductors are connected to the motor 174 with a polarity such that as the pipe location moves further away, the motor turns in a direction which lowers the optical assembly so that the laser beam remains focused at the weld point. Conversely, as the pipe location moves closer to the focusing lens, the motor rotates in the opposite direction by a sufficient amount such that the optical assembly is raised and the laser beam remains focused at the weld point.

The arrangement shown in FIG. 22 is not a feedback system. A change in pipe location simply controls a compensating change in the location of the focusing lens. It is contemplated, of course, that feedback arrangements may be employed. In such a case, an error signal may be developed and a corresponding change be effected in the lens position until the error is eliminated. However, such a feedback system, with its concomitant complexities, is not necessary. It is sufficient — if focusing control is employed in the first place — to provide a direct control of the focusing optics in accordance with the location of the section of pipe being lined.

Referring to FIG. 7, it will be recalled that the resistant metal strip, as it is being laid against the pipe wall, is slightly flexed downwardly. The laser beam, which is focused down along weld line 140, generates sufficient heat to weld two ribbon layers to each other (and periodically, or even always, to weld the lining to the pipe wall as well). Because of the downward flexing of the ribbon, the ribbon stays in intimate contact with the previously formed adjacent turn and both press firmly against the pipe wall. The pipe itself serves as a heat sink to conduct away the heat generated at the weld point so that degradation of the weld, e.g., from carbide precipitation, as a result of excessive heating is minimized.

Figure 23:
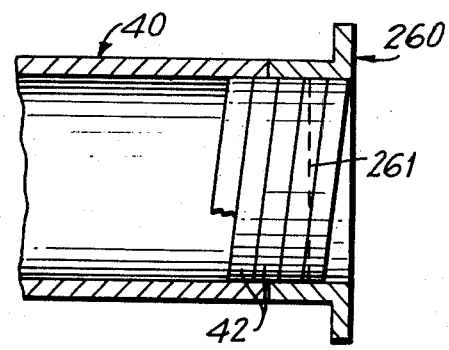
FIG. 23 is a sectional view depicting an end of the pipe to which a flange is attached prior to forming the lining.

FIG. 23 illustrates the manner in which a resistant metal flange can be secured to each pipe end. As shown in FIG. 23, a resistant metal flange 260 is butt welded to an end of pipe 40. Several turns 42 are also shown. It will be apparent that the lining may be started at a point inside the pipe but on the flange so that no part of the lining need be cut off of the pipe at the completion of the job. The only parts of the finished product which are not lined are an internal portion of the flange at each end of the pipe. However, since the flange itself is made of a resistant metal, e.g., stainless steel, that poses no problem. Flanges are often welded to a pipe in the first place in order to provide a convenient way to connect pipes to vessels.

Where the lining is attached to the pipe at the ends of the pipe, it is possible to protect the ends of the pipe to assure a continuity of corrosion resistance by other techniques. One such technique involves "buttering" the ends of the pipe and the fittings by welding a layer of resistant metal using a weld filler rod of resistant metal and then beveling the added layer of resistant metal before attaching the lining to the pipe, the lining being attached to the buttered area such that no leakage paths exist nor do exposed areas of corrosion - prone pipe metal. For example, the tungsten arc process using a weld filler rod such as Inconel Filler Metal 82 can be employed for the "buttering" operation. It is relatively easy to work on the ends of the pipe in this fashion as the regions involved are accessible. Flanges are normally used on pipe ends when connecting to other types of vessels, but for economic reasons "buttering" or other techniques, such as welding a short stub of pipe or a ring resistant to corrosion to the pipe prior to lining it for subsequent attachment to another pipe, are used for joining pipes to each other to form the desired piping system.

It may be important in some applications, however, to make two additional welds — not only in the arrangement of FIG. 23, but even in the case where the lining extends to a buttered area or ring and is then cut. At the ends of the spiral ribbon in the finished product, the spaces between the cut ends of the ribbon and the pipe are open. These openings must be closed (unless they are otherwise sealed when pipe sections are joined) or else the aggressive fluid flowing through the finished pipe will find its way into the helical space between the pipe wall and the lining. All that is required is to close the openings, e.g., by use of filler metal added to close them, and then to form a circular laser weld attaching the lining thereby to the inside buttered wall of the pipe or ring at each end with a desired weld pattern. The circular weld location is shown by dashed line 261 in FIG. 23. It is sufficient to form a circular (or some other closed shape) weld pattern anywhere within the protected end area of the pipe. It is of no moment that the edge of the ribbon lining is open because it is backed by resistant metal.

Referring to FIG. 1, a circular weld pattern may be made simply by positioning the weld-forming trolley in the proper position along guide 68, removing drive chain 56, and then operating motor 50 in either direction. In such a case, the pipe is rotated but the two worm gears do not turn. Consequently, the two trolleys remain in their fixed positions. A circular weld pattern can be formed as the pipe rotates. When this weld pattern is formed, the power level of the laser should be such that the lining is welded continuously to the underlying material; this insures that the space between the lining and the pipe is completely sealed (providing that the underlying region of the spiral void has been filled with corrosion-resistant material).

Figure 24:
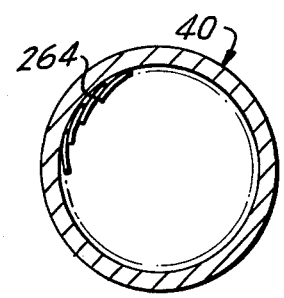
FIGS. 24–26 are sectional views depicting three alternative forms of linings.

FIG. 24 depicts an alternative form of lining. Pipe 42 is lined by a series of longitudinal strips of ribbon 264. (This can be thought of as a spiral of infinite pitch.) The strips may all be held in place as all of the overlapped edges are welded at the same time, e.g., by a trolley which travels down a central guide and splits an incoming laser beam into as many radial directions as there are lining strips. The pipe is more difficult to line this way (even though it need not be rotated) because it is necessary to handle numerous strips simultaneously. Alternatively, it is possible to work with only one strip at a time. In such a case, the pipe would not be rotated as each strip is laid at the bottom of the inside wall and welded to a previous strip. Only after a complete longitudinal weld is made would the pipe be rotated slightly so that another strip could be laid in place on the bottom of the pipe and welded. What is of the utmost importance is the form of each weld, that is, preventing the efficacy of the lining from being destroyed as the result of a single weld flaw. Particular exemplary weld patterns will be described below, along with the theory behind them.

Figure 25:
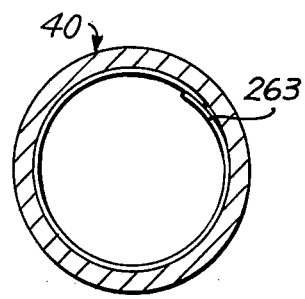

FIG. 25 shows yet another form of lining. Here, pipe 42 is lined by a single sheet of stainless steel 263 whose two edges overlap. In such a case, only a single longitudinal weld line along the overlapped edge regions is necessary, although weld patterns as will be described later are preferable (together with circumferential end welds and filling of voids). While it is more difficult to work with a single large sheet and assure good contact with the pipe than it is with a narrow strip, the arrangement of FIG. 25 is within the embrace of the invention insofar as it pertains to weld patterns.

Figure 26:
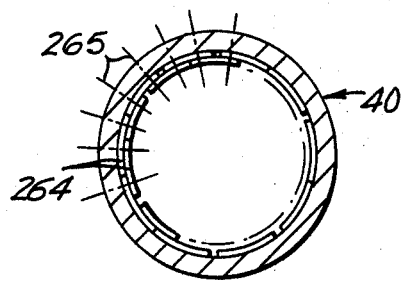

FIG. 26 shows still another form of lining. Here, pipe 42 is lined by two layers of longitudinal strips 264, one layer being disposed on top of the other. Rather than to require each strip in the embodiment of FIG. 24 to have one edge on top of an adjacent strip so that the strips do not lay flush against the pipe wall, in the embodiment of FIG. 26 the strips in the outer series lay flush against the pipe wall and the strips in the inner series partially or fully overlap the strips in the outer series. The reason that two series of strips are employed is that it is somewhat easier to conform the lining strip to the interior surface of an irregularly shaped pipe by this technique. In the arrangement of FIG. 26, it is not necessary that the strips in each series butt against each other. Some strips are shown butting against each other and some are not. Whatever gaps there are in the outer series of strips are shielded by strips in the inner series. It is apparent that each strip in one series overlaps adjacent strips in the other series. The ends of the lining can be closed by the technique described previously. A disadvantage of this approach is that additional welds are required. As shown by dashed lines 265, which represent radial weld positions, as many longitudinal welds are required as there are lining strips. Once again, what is important in each longitudinal weld is maintaining the lining integrity despite the presence of occasional weld flaws.

Before turning to the various weld patterns — which aspects of the invention are applicable even to other welding techniques, e.g., TIG and electron-beam — it should be emphasized that the lining apparatus described in detail above, as well as the lining procedures, are only illustrative of the principles of the invention. For example, it is certainly within the embrace of the invention to utilize an adhesive for securing the lining strips against the pipe (in addition to forming welds), with the adhesive being applied either to the inside wall of the pipe or the outside face of the lining, the adhesive being applied either prior to the laying of the strip or strips against the pipe wall or even during the cladding process. And while in the illustrative embodiment of the invention, only the spiral-forming trolley and the weldforming trolley move longitudinally, while it is the pipe which is rotated, it is also feasible, although less desirable, to hold the pipe stationary and to have the trolleys rotate within it at the same time that they move longitudinally. The main disadvantages of this approach is that a twist will develop in the ribbon being fed from the supply roll 41 in FIG. 1 (unless the supply roll is actually turned together with the spiral-forming trolley), and the rotation of the weld-forming trolley makes it more difficult to maintain a uniform weld-spot size. Similarly, it may be the pipe which is moved axially rather than the apparatus performing the ribbon-laying and weld-forming functions. It is also feasible to mount the laser on the weld-forming trolley or the trolley guide, rather than to mount it external to the pipe. This approach is more difficult, however, if it is desired to line small-diameter pipes.

It is also of interest to note that the integrity of the lining may be verified quite simply. All that is required is to bore a small test hole through the pipe wall (but not through the lining) and then to place the lining under pressure. If there is a leak through the lining, it can be detected at the test hole (preferably, the test hole is bored in the pipe where the lining does not contact the interior pipe wall) because of the continuous spirally-shaped "empty" space between the lining and the pipe wall from one end of the pipe to the other. A similar test procedure can be employed for other lining configurations. For example, referring to FIG. 24, if each longitudinal weld simply secures overlapping ribbon edges to each other, and only at spaced intervals is a spot weld made for securing the lining to the pipe, it is apparent that there is a passageway from any region between the lining and the pipe wall to any other region between the lining and the pipe wall. Consequently, a single flaw anywhere in the lining will result in the escape of air through a test hole.

An added benefit of the use of a laser to form the weld is that is is often possible to determine the precise position of a flaw. The laser output may be monitored, for example, by allowing the rear normally totally-reflecting mirror to be partially transmissive. The small amount of laser energy which is thus transmitted out of the rear of the laser may be detected and a signal generated responsive to the power level which is used to form a chart trace of power level versus time or position along the pipe where welding is taking place. Wherever there is a change in the chart trance indicating an excessive undesired change of power, it can be suspected that the corresponding weld section is imperfect.

Figure 27:
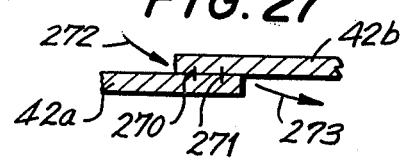
FIG. 27 depicts two overlapping ribbon edges and will be helpful in understanding the difficulty in achieving a lining of adequate integrity when simple linear welds are formed.

FIG. 27 is a sectional view through two strip turns whose edge regions overlap, and will be helpful in understanding why the weld pattern is of such concern. It is assumed that the right edge region of turn 42a lays flat against the pipe wall, and that the left edge region of turn 42b — which overlaps the edge regions of turn 42a — is disposed more inwardly toward the center of the pipe. Arrow 272 represent fluid inside the pipe, and arrow 273 represents fluid which will attack the pipe wall if a leak develops in the weld region where the two turns overlap.

The two short line sections 270, 271 represent welds. It is apparent that if there is a flaw in weld 270, the fluid may flow between the two strip turns between weld 270 and weld 271, but as long as there is no flaw in weld 271, the fluid cannot leak through the lining. Conversely, a flaw in weld 271 alone similarly does not result in a leak. Obviously, two welds offer more protection than only one. Therefore, it might be thought that the integrity of the lining can be achieved simply by forming not a single spiral weld from one end of the pipe to the other along the overlapping edges, but perhaps two, three or even more linear welds, all helical in shape and parallel to each other.

However, forming linear welds of this type, even several of them, still results in a high reject rate. The reason for this is that the length of each linear weld from one end of a typical pipe to the other may be hundreds of feet long due to the many turns in the spiral. No matter how reliable the welding equipment, it is highly likely that there will be at least one flaw along each linear weld, and if there is only one flaw in each of several parallel welds, that is sufficient to destroy the integrity of the lining. The flaw in the weld closest to the exposed edge of the ribbon within the pipe allows the fluid inside to seep between the overlapping edge regions from one end of the pipe to the other. The flaw in the adjacent weld line permits the fluid to seep into the region between this weld line and the next, between the overlapping edge regions. This process continues until fluid eventually seeps out from the last weld line and attacks the interior wall of the pipe.

What I have discovered is that leaks can be almost entirely eliminated by forming a weld pattern, within the confines of the overlapping edge regions of adjacent turns of lining, substantially all of which consists of small intersecting or tangent bounded regions. The principle is perhaps best illustrated by the weld pattern of FIG. 28. Here, there are shown two parallel linear welds 283 (by a "linear" weld I mean a weld line whose curvature in space is constant), together with perpendicular closely spaced welds 284, each of which crosses the two linear welds 283. The overall appearance of the weld pattern is that of a railroad track. If all that the weld consists of are the "rails" without the "cross-ties", a single flaw anywhere along each of the weld lines will result in a leak. However, with the cross-ties, and disregarding the possibility of a leak through or along a cross-tie, the only way that a leak can result if there is a flaw in each of the rails between the same pair of cross-ties, that is, two flaws on opposite rails are contained in the same localized bounded (enclosed) region 285. It is the formation of small "intersecting" (which term, as used hereinafter, includes "tangent" as a limiting case) bounded regions that assures the integrity of the lining even though the welding itself may not be ideal.

Figure 28:
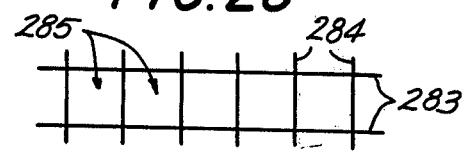
FIGS. 28–39 depict several weld patterns which illustrate and are exemplary of the principles of the invention, the weld pattern of FIG. 29 being that formed in the illustrative embodiment of the invention.

This can be appreciated by the following approximate mathematical analysis of the relative reliabilities of the weld pattern of FIG. 28 as compared with a linear weld of the same length (i.e., along the same length of overlapped edge regions). Let it be assumed that the probability of there being at least one flaw or defect in a unit length of weld is P, where P is relatively small, and that the probability of a weld defect occurring anywhere is independent of the probabability of a weld defect occurring anywhere else. It follows that the probability of there being no defect in each unit-length weld segment is (1-P), and thus in the case of a long linear weld N units of length long, the probability of there being no defect at all is $(1-P)^N$ — the product of the N independent probabilities.

Consider now the case where the cross-ties 284 in FIG. 28 are employed at intervals of a unit length. The probability of there being at least one defect on each side of a bounded region 285 (i.e., a leak) is $P^2$. The probability of there being no leak through any single bounded region 285 is therefore $(1-P^2)$, and the probability of there not being a leak anywhere in the N regions 285 contained along an N unit-length interval is $[1-P^2]^N$.

The improved reliability contributed by the rails and cross-ties over a simple linear weld can be given a quantitative value. The factor by which the probability of there being no leak increases is simply the ratio of the two "no-leak" probabilities, i.e., $[1-P^2]^N/(1-P)^N$. The improvement factor is therefore $(1+P)^N$. Although P may be small, (1+P) raised to the power N (which is typically large) can be a very significant number because (1+P) is greater than unity. Consequently, it is seen that for any given practical probability of defect in welding, the increased probability of there being no leak in the overall lining using the weld pattern of FIG. 28 increases quite rapidly with the length of the weld (or conversely, with the decrease in cross-tie spacing).

To a manufacturer, what is most significant is the reduction in reject rate. In the case of a simple linear weld, the probability of a leak is $1-(1-P)^N$, and in the case of the weld pattern of FIG. 28, the probability of a leak is $1-(1-P^2)^N$. The ratio of the former to the latter, i.e., the improvement in reject rate, is very large. As an example of the above, in which it is assumed that the unit length is one inch, if N = 5,000 inches and P = 0.001, then $1-[1-P^2]^N \approx 0.005$, and $1-[1-P]^N \approx 0.9933$; the ratio of reject probabilities is 0.9933/0.005 or approximately 198. As a further example, suppose that N = 5,000 inches and P = 0.0001. In such a case, the ratio of interest is in excess of 5,000!

A weld pattern related to that shown in FIG. 28 can be achieved using the apparatus of the invention. During the initial lining operation, motor 190 on the weld-forming trolley is not energized. The mirror does not oscillate and therefore a linear weld is formed from one end of the pipe to the other along the spiral edge region of overlap. The strip beyond the edge of the weld is cut, the loose end is pulled out from the strip-laying trolley, and the drive rollers are disengaged from the pipe wall and locked. Then the motor 190 is briefly energized to cause the mirror to move slightly with the result that the focus point on the overlapped lining edge region is displaced slightly. If the motor 50 is then operated in the reverse direction, another weld will be formed as the weld-forming trolley moves back to its starting position, with this second weld being displaced slightly from the first weld. There thus results a pair of parallel welds. Thereafter, the motor 50 is operated in the original direction with the weld-forming trolley once again traversing the pipe from one end to the other. This time the mirror is not continuously oscillated nor is the laser continuously operated. Instead, after every inch of travel of the overlapped edges underneath the weld-forming trolley, the mirror may make a single sweep between its two extreme inclination points thus causing the focus spot to move across its maximum excursion over the overlapped edge regions of the strip while a burst of laser energy is generated. This results in the formation of a weld line equivalent in function to a single "cross-tie", following which the mirror is returned to its initial extreme position while the laser is not operated. This sequence is repeated as the weld-forming trolley travels the length of the pipe with the resultant weld lines being separated by one inch. Although the cross-ties may not be perpendicular to the two long parallel weld lines, that is of no moment because localized bounded regions are still evident in the overall weld pattern. (Nearly perpendicular cross-ties can be formed by stopping the pipe each time. Alternatively, the mirror may make a very fast sweep, although in this case high-power laser beam pulses should be generated.)

Figure 29:
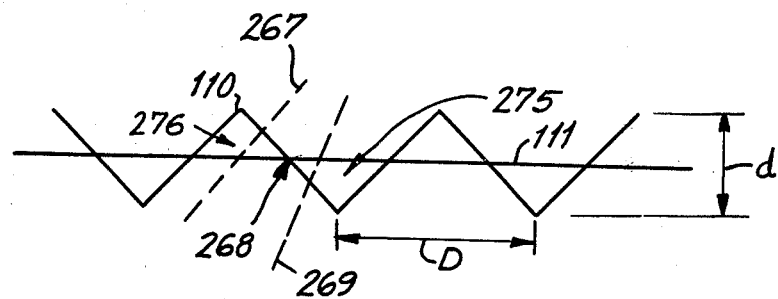

FIG. 29 depicts in greater detail the weld pattern which is actually shown in FIG. 4a. This pattern is very easy to achieve. The saw-tooth-shaped weld line 110 is formed during the first pass of the trolleys down the pipe, as a result of the continuously oscillating mirror. Thereafter, the mirror oscillation may be stopped as the pipe is turned in the reverse direction and the weld-forming trolley moves back to its starting position. Without the mirror oscillation weld line 111 is formed. Typical values for dimensions D and d, respectively, are 1 and 0.2 inches. The net effect is that thousands of small completely enclosed regions such as 275 and 276 may be formed. The only way that a leak can develop is if at least two flaws occur for one of the small region boundaries, for example, if there are flaws at each of the two points where dashed line 267 intersects the boundary of region 275. The probability of there being two such flaws on any closed border is typically so low that even with thousands of small bounded regions, the probability is low that a leak will develop. It should be noted that a leak will develop if there is a flaw at any of the intersections of weld lines 110 and 111, for example, at the intersection point indicated by the numeral 268. However, the likelihood of there being such a leak is low as the amount of welding represented by the intersection points is small as compared to the total length of weld required, so that it is unlikely that a flaw, if there is one, will be at such an intersection point.

Figure 30:
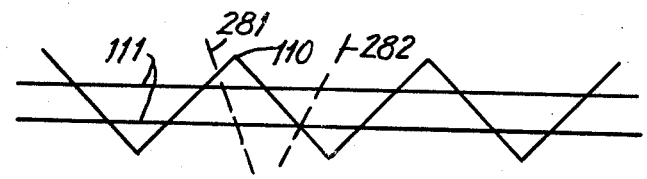

FIG. 30 illustrates still another weld pattern. It is quite similar to that of FIG. 29, except that there is an additional linear weld. The two linear welds may be formed as described in connection with weld lines 283 in FIG. 28. All that is required is another pass of the weld-forming trolley down the pipe utilizing the apparatus of the illustrative embodiment of the invention. An inspection of dashed line 281 in FIG. 30 reveals that for almost all potential leaks, there must be at least three flaws in a small region. Dashed line 282 indicates that even if there is a flaw at an intersection point, there will still be no leak unless there is a flaw in a linear weld immediately adjacent to it.

Figure 31:
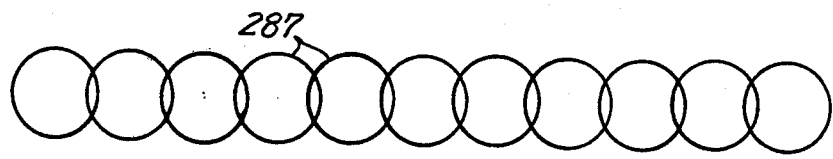

FIG. 31 illustrates a weld pattern which consists of overlapping circles 287. It is apparent that for there to be a leak anywhere, there must be a flaw on each of opposite halves of a circle. The laser beam deflection optics required to produce such circular welds will be apparent to those skilled in the art.

Figure 32:
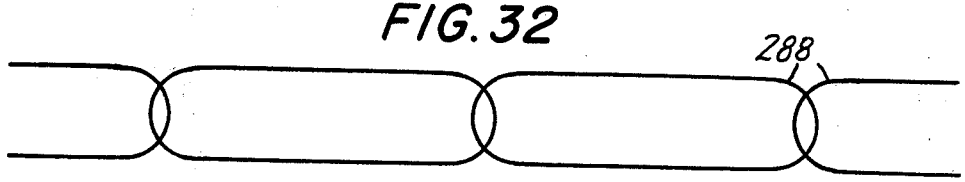

FIG. 32 shows a similar weld pattern consisting of long overlapping links 288. The reason for including FIG. 32 in the drawings is to illustrate the importance of providing relatively small bounded regions. In the extreme case, a single link is equivalent to nothing more than two parallel weld lines — not a preferred pattern. If there are only a few (very long) links in the pattern, the situation is not very much improved; there is still a large probability that there will be a flaw in each of the two halves of at least one link. The smaller the localized bounded regions, the greater the probability of there being no leak.

Figure 33:
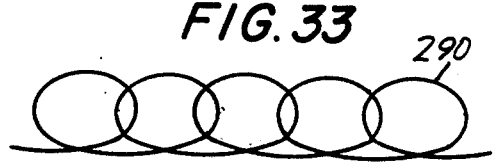

FIG. 33 depicts still another weld pattern. It is similar to the pattern of FIG. 31, but it consists of a single continuous weld 290. The weld pattern is more advantageous than that of FIG. 31 and is easier to achieve because the mirror can form the pattern more easily.

Figure 34:
Figure 35:
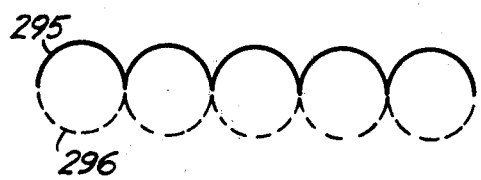

FIG. 34 depicts two sawtooth-shaped welds 297 and 298 which may be formed during the successive passes of the weldforming trolley down the pipe (with an appropriate mirror displacement between passes). For the two-weld pattern depicted in FIG. 35, it is necessary to assure that the two welds 295, 296 (the latter being shown by dashed lines) overlap at each point of discontinuity or else the size of the bounded regions and the probability of a leak developing will increase.

Figure 36:
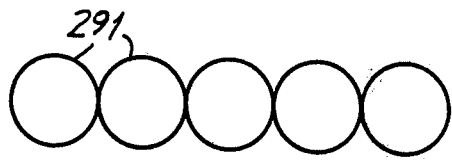
Figure 37:
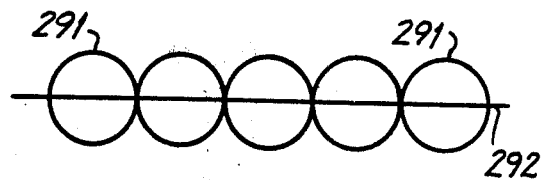
Figure 38:
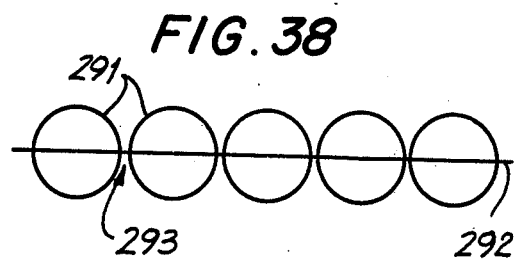

The pattern of FIG. 36 is similar to that of FIG. 31 except that circles 291 are tangent to each other rather than overlapping. The weld pattern is not as "safe" as that of FIG. 31. To safeguard against the possibility of two adjacent circles not being tangent to each other, a linear weld 292 may be added as shown in FIG. 37. A rather extreme case is that shown in FIG. 38. Here, several successive circular welds 291 are shown being not tangent to each other. While substantially all of the pattern consists of small bounded regions, there are regions, such as that indicated by the numeral 293, where the only "protection" is that afforded by the single linear weld 292. (The provision of a second parallel linear weld, also intersecting all of the circles, would result in a pattern consisting totally of small bounded regions.) But that is not to say that the weld pattern of FIG. 38 is not better than one or even several parallel weld lines which do not define small bounded regions. The weld pattern of FIG. 38 is clearly better than this.

Figure 39:
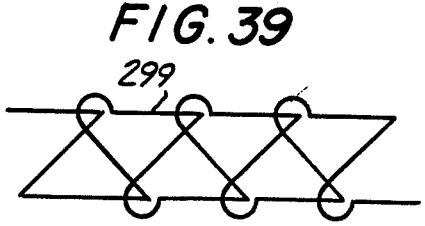

FIG. 39 is designed to show how a single continuous weld 299 may be formed in a more complicated pattern but which still results in many very small completely bounded regions.

It is apparent that there is an endless number of weld patterns which can be employed which satisfy the criteria of my invention. In general, all such weld patterns consist of relatively small bounded regions. It is apparent that the larger these regions are on the average (i.e., the lower the number of these regions within the overlapped edge regions which are welded together), the greater is the probability of a leak through the lining.

It is difficult to determine a precise cut-off point below which the benefits of my invention can be realized. However, it is certainly clear that the benefits of my invention are realized under the following circumstances.

First, the benefits of my invention are clearly apparent when the length of the overlapped edge regions exceeds five feet, that is, in the case of a spiral lining, the length along the spiral overlap is at least five feet. Second, the benefits of my invention are clearly apparent when there are bounded regions, having a maximum length of one foot along the length of the overlapped edge regions, along at least 75% of the length of the overlapped edge regions. If more than 25% of the length of the overlapped edge regions is not protected by bounded regions under one foot in length, then the weld pattern is not preferred.

Typically, a continuous or quasi-continuous Nd:YAG solid-state or $CO_2$ gas laser can be used. For example, a Nd:YAG laser providing 320 watts of power can be utilized to form welds on overlapped edge regions of a type 316 stainless-steel ribbon laid down in a spiral pattern inside a steel pipe. With 0.010 inch thick lining, a weld may be made at a rate of approximately 60 inches per minute. Using a $CO_2$ gas laser providing 6 kilowatts of power and with 0.05 inch thick lining, a weld may be made at the rate of 300 inches per minute. Obviously, for a given spot size the slower that the pipe is rotated, the greater is the energy applied to the area being welded. At the rates set forth above, the energy supplied is sufficient not only to weld overlapping edges of the steel ribbon to each other, but also to attach the lining to the pipe. The lining process can be accomplished with fewer passes of the weld-forming trolley if the laser beam redirecting mechanism consists of two or more mirrors, prisms, etc. for forming more than one focused spot on the edge region of the overlapped strip where welding is desired, more than one weld thus being formed simultaneously.

In general, laser welding as described above is particularly beneficial when stainless steel ribbons having a thickness in the range 0.002 – 0.100 inches are used; when forming spiral linings, the width of the ribbon may typically vary from as low as one inch to as high as several feet, depending especially on the size of the vessel to be lined. For the thicker linings, separate apparatus for forming the strip onto the vessel may be required, with subsequent welding taking place, or motors may be required to drive the strip through the spiral-forming trolley.

It is also possible to utilize electron-beam welding equipment to form weld patterns according to my invention although such welding must take place in a carefully controlled vacuum environment, or TIG (tungsten inert gas) welding techniques which also do not require filler material may be used to effect a weld. (Other techniques can also be employed although they are not as desirable.) However, laser welding is the preferred technique. The laser focused spot size at the weld point may be very small; with such a high concentration of energy, not only can the weld proceed at high speed, but there is much less risk of the lining becoming distorted by reason of a large heat-affected zone in the area of the weld. Laser welding has been found to offer the most desirable combination of ease in use and minimal thermal distortion. Of course, the facts that laser welding may be performed in an open-air environment and that the laser may be kept external to the pipe (steering and focusing of the beam being very simple to achieve) are primary advantages.

It is also possible to shield the welding zone from the atmosphere by blowing an inert gas, e.g., argon, in order to prevent oxidation.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What I claim is:

1. Apparatus for lining the inside wall of a pipe comprising means external to said pipe for feeding a continuous strip of lining material into one end of said pipe, means for moving inside said pipe from one end thereof to the other to lay down said strip against the pipe waLL, means for controlling relative rotational movement between said pipe and said lay-down means so that said strip is wound against the pipe wall, the relative linear speeds and the relative rotational speeds of said pipe and said lay-down means being such that said strip is laid down against the pipe wall by said lay-down means in a helical shape with continuous overlapping edge regions, and means for welding together said continuous overlapping edge regions.

2. Apparatus in accordance with clain 1 wherein said welding means welds together said overlapping edge regions in synchronism with the formation of the helical winding by said lay-down means.

3. Apparatus in accordance with claim 1 wherein said welding means includes laser means external to said pipe for directing a laser beam along the inside of said pipe, and means inside said pipe for redirecting said laser beam against said overlapping edge regions of the helical winding formed within the pipe for welding said overlapping edge regions together.

4. Apparatus in accordance with claim 3 wherein said lay-down means and said laser beam redirecting means move in synchronism inside said pipe in the axial direction thereof.

5. Apparatus in accordance with claim 4 wherein said laser beam redirecting means further includes means for varying the direction along which said laser beam impinges upon said overlapping edge regions to control a weld pattern consisting primarily of short intersecting closed lines each of which encloses a bounded region.

6. Apparatus in accordance with claim 4 wherein the relative motions are controlled by means for maintaining said pipe in a stationary axial position and for rotating said pipe around the axis thereof, and means for maintaining said lay-down means and said redirecting means in a predetermined radial position relative to said pipe and for moving them within said pipe from one end thereof to the other.

7. Apparatus in accordance with claim 3 further including guide means extending along the inside of said pipe from one end thereof to the other for supporting said lay-down means and said redirecting means.

8. Apparatus in accordance with claim 7 further including means for enabling the withdrawal of said guide means from inside said pipe.

9. Apparatus in accordance with claim 7 wherein said lay-down means and said redirecting means are controlled to move along the inside of said pipe by warm gear means extended along the inside of said pipe from one end thereof to the other, and a plurality of means connected at spaced intervals to said guide means for supporting said worm gear means and for permitting said lay-down means and said redirecting means to pass thereover.

10. Apparatus in accordance with claim 3 wherein said lay-down means includes means for engaging the inside wall of said pipe for controlling the lay-down of said strip, and means for effecting a disengagement thereof to facilitate movement of said lay-down means inside said pipe when said strip is not to be laid down.

11. Apparatus in accordance with claim 3 wherein said laser beam redirecting means further includes means for varying the direction along which said laser beam impinges upon said overlapping edge regions to control a weld pattern consisting primarily of short intersecting closed lines each of which encloses a bounded region.

12. Apparatus in accordance with claim 11 wherein said laser beam redirecting means is operative to control a weld pattern having bounded regions with a maximum length of one foot along at least 75% of the length of the overlapping edge regions.

13. Apparatus in accordance with claim 3 further including means for focusing the redirected laser beam on the overlapping edge regions of the helical winding to be welded together, and means for sensing variations in the location of the overlapping edge regions being welded relative to said focusing means and responsive thereto for maintaining a predetermined focusing of said laser beam on the overlapping edge regions.

14. Apparatus in accordance with claim 3 wherein said strip of lining material is fed into one end of said pipe and said laser beam is directed into the other end of said pipe.

15. Apparatus in accordance with claim 3 wherein said lay-down means includes means for feeding said strip against said pipe wall, and means for engaging said pipe wall and responsive to the relative rotational speeds of said pipe and the lay-down means for controlling the rate of operation of said feeding means.

16. Apparatus in accordance with claim 14 further including means for selectively disengaging said engaging means from said pipe wall.

17. Apparatus in accordance with claim 16 wherein said lay-down means includes guide means therearound for forming said strip into a spiral of decreasing pitch from one end thereof to the other along the axial direction of said pipe.

18. Apparatus in accordance with claim 15 wherein said lay-down means includes guide means therearound for forming said strip into a spiral of decreasing pitch from one end thereof to the other along the axial direction of said pipe.

19. Apparatus in accordance with claim 15 further including means for flexing said strip as it is laid down against said pipe wall in a direction which forces one edge region of said strip to bear against an edge region of the adjacent priorly laid strip section to facilitate the welding together thereof.

20. Apparatus in accordance with claim 3 wherein said welding means is further operative to weld said lining material at at least several locations to said pipe wall.

21. Apparatus in accordance with claim 1 wherein said lay-down means includes means for feeding said strip against said pipe wall, and means for engaging said pipe wall and responsive to the relative rotational speeds of said pipe and the lay-down means for controlling the rate of operation of said feeding means.

22. Apparatus in accordance with claim 21 further including means for selectively disengaging said engaging means from said pipe wall.

23. Apparatus in accordance with claim 22 wherein said lay-down means includes guide means therearound for forming said strip into a spiral of decreasing pitch from one end thereof to the other along the axial direction of said pipe.

24. Apparatus in accordance with claim 21 wherein said lay-down means includes guide means therearound for forming said strip into a spiral of decreasing pitch from one end thereof to the other along the axial direction of said pipe.

25. Apparatus in accordance with claim 1 further including means for flexing said strip as it is laid down against said pipe wall in a direction which forces one edge region of said strip to bear against an edge region of the adjacent priorly laid strip section to facilitate the welding together thereof.

26. Apparatus for lining a cylindrically-shaped inside wall of an open-ended vessel comprising means external to said vessel for feeding a continuous strip of lining material into one end of said vessel, means inside said vessel to lay down said strip against said wall, means for controlling relative axial and rotational movements between said vessel and said lay-down means so that said strip is wound against said wall, the relative linear speeds and the relative rotational speeds of said vessel and said lay-down means being such that said strip is laid down against said wall by said lay-down means in a helical shape with continuous overlapping edge regions, and means for welding together said continuous overlapping edge regions.

27. Apparatus in accordance with claim 26 wherein said welding means welds together said overlapping edge regions in synchronism with the formation of the helical winding by said lay-down means.

28. Apparatus in accordance with claim 26 wherein said welding means includes laser means external to said vessel for directing a laser beam along the inside of said vessel, and means inside said vessel for redirecting said laser beam against said overlapping edge regions of the helical winding formed against said wall for welding said overlapping edge regions together.

29. Apparatus in accordance with claim 28 wherein said lay-down means and said laser beam redirecting means move in synchronism inside said vessel in the axial direction thereof.

30. Apparatus in accordance with claim 28 further including guide means extending along the inside of said vessel from one end thereof to the other for supporting said lay-down means and said redirecting means.

31. Apparatus in accordance with claim 30 further including means for enabling the withdrawal of said guide means from inside said vessel.

32. Apparatus in accordance with claim 28 further including means for focusing the redirected laser beam on the overlapping edge regions of the helical winding to be welded together, and means for sensing variations in the location of said wall and responsive thereto for maintaining a predetermined focusing of said laser beam on the overlapping edge regions to be welded together.

33. Apparatus in accordance with claim 28 wherein said strip of lining material is fed into one end of said vessel and said laser beam is directed into the other end of said vessel.

34. Apparatus in accordance with claim 28 wherein said welding means if further operative to weld said lining material at at least several locations to said wall.

35. Apparatus in accordance with claim 28 wherein said laser beam redirecting means further includes means for continuously varying the direction along which said laser beam impinges upon said overlapping edge regions to effect a weld pattern consisting primarily of short intersecting closed lines each of which encloses a bounded region.

36. Apparatus in accordance with claim 35 further including means for focusing the redirected laser beam on the overlapping edge regions of the helical winding to be welded together, and means for sensing variations in the location of said wall and responsive thereto for maintaining a predetermined focusing of said laser beam on the overlapping edge regions to be welded together.

37. Apparatus in accordance with claim 26 wherein said lay-down means includes means for engaging said wall for controlling the lay-down of said strip, and means for effecting a disengagement thereof to facilitate movement of said lay-down means inside said vessel when said strip is not to be laid down.

38. Apparatus in accordance with claim 26 wherein said welding means is operative to form a weld pattern consisting primarily of short intersecting closed lines each of which encloses a bounded region, wherein bounded regions, with a maximum length of one foot along the length of the overlapping edge regions, are formed along at least 75% of the length of the overlapping edge regions.

39. Apparatus in accordance with claim 26 wherein the relative motions are controlled by means for maintaining said vessel in a stationary axial position and for rotating said vessel around the axis thereof, and means for maintaining said lay-down means in a predetermined radial position and for moving it within said vessel from one end thereof to the other.

40. Apparatus in accordance with claim 39 wherein said lay-down means includes guide means therearound for forming said strip into a spiral of decreasing pitch from one end thereof to the other along the axial direction of said vessel.

41. Apparatus in accordance with claim 26 wherein said lay-down means includes means for feeding said strip against said wall, and means for engaging said wall and responsive to the relative rotational speeds of said vessel and the lay-down means for controlling the rate of operation of said feeding means.

42. Apparatus in accordance with claim 41 further including means for selectively disengaging said engaging means from said wall.

43. Apparatus in accordance with claim 42 wherein said lay-down means includes guide means therearound for forming said strip into a spiral of decreasing pitch from one end thereof to the other along the axial direction of said vessel.

44. Apparatus in accordance with claim 26 wherein said lay-down means includes guide means therearound for forming said strip into a spiral of decreasing pitch from one end thereof to the other along the axial direction of said vessel.

45. Apparatus in accordance with claim 44 further including means for flexing said strip as it is laid down against said wall in a direction which forces one edge region of said strip to bear against an edge region of the adjacent priorly laid strip section to facilitate the welding together thereof.

46. Apparatus in accordance with claim 26 further including means for flexing said strip as it is laid down against said wall in a direction which forces one edge region of said strip to bear against an edge region of the adjacent priorly laid strip section to facilitate the welding together thereof.

47. Apparatus in accordance with claim 26 wherein said lay-down means is controlled to move along the inside of said vessel by worm gear means extended along the inside of said vessel from one end thereof to the other, guide means extending along the inside of said vessel from one end thereof to the other for supporting said lay-down means, and a plurality of means connected at spaced intervals to said guide means for supporting said worm gear means and for permitting said lay-down means to pass thereover.

48. Apparatus in accordance with claim 26 wherein said welding means is further operative to weld said lining material at least several locations to said wall.

49. A method for lining a cylindrically-shaped inside wall of an open-ended vessel comprising the steps of feeding a continuous strip of lining material from outside said vessel axially into one end of said vessel, laying down said strip against said wall in the circumferential direction thereof, controlling relative axial and rotational movements between said vessel and said strip so that said strip is wound against said wall, the relative linear speeds and the relative rotational speeds of said vessel and said strip being such that said strip is laid down against said wall in a helical shape with continuous overlapping edge regions, and welding together said continuous overlapping edge regions; and wherein in said welding step a laser beam is directed from outside the vessel along the inside thereof, and said laser beam is redirected against said overlapping edge regions of the helical winding formed against said wall for welding said overlapping edge regions together.

50. A method in accordance with claim 49 wherein the direction along which said laser beam impinges upon said overlapping edge regions is varied to control a weld pattern consisting primarily of short intersecting closed lines each of which encloses a bounded region.

51. A method in accordance with claim 50 further including the steps of focusing the redirected laser beam on the overlapping edge regions of the helical winding to be welded together, and sensing variations in the location of said wall and responsive thereto for maintaining a predetermined focusing of said laser beam on the overlapping edge regions to be welded together.

52. A method in accordance with claim 49 wherein said strip of lining material is fed into one end of said vessel and said laser beam is directed into the other end of said vessel.

53. A method in accordance with claim 49 wherein a weld pattern is formed which consists primarily of short intersecting closed lines each of which encloses a bounded region, said pattern having bounded regions, with a maximum length of one foot along the length of the overlapping edge regions, along at least 75% of the length of the overlapping edge regions.

54. A method in accordance with claim 49 wherein the relative motions are controlled by maintaining said vessel in a predetermined axial position and rotating said vessel around the axis thereof, and maintaining the point of initial contact of said strip with said wall in a predetermined radial position and moving it within said vessel from one end thereof to the other.

55. A method in accordance with claim 49 wherein said vessel is rotated and said strip is fed against said wall at a rate determined by the rotational speed of said vessel.

56. A method in accordance with claim 49 wherein said strip is formed into a spiral of decreasing pitch from its point of entry in the vessel until it is laid down against said wall.

57. A leak-proof pipe comprising at least one sheet of lining material disposed in contact with the inside wall of the pipe, said at least one sheet of lining material being formed in the shape of an open cylinder and having overlapped sheet edge regions at least five feet in total length, said overlapped sheet edge regions being welded together in a pattern consisting primarily of short intersecting closed lines each of which encloses a bounded region, said pattern having bounded regions with a maximum length of one foot along at least 75% of the total length of said overlapped sheet edge regions.

58. A leak-proof pipe in accordance with claim 57 wherein said overlapped sheet edge regions are welded together by a laser weld.

59. A leak-proof pipe in accordance with claim 58 wherein said at least one sheet of lining material is a ribbon whose width is substantially smaller than the length of said overlapped sheet edge regions and which is formed in the shape of a spiral having overlapped edge regions.

60. A leak-proof pipe in accordance with claim 59 wherein said ribbon is laser-welded to said pipe at least one location.

61. A leak-proof pipe in accordance with claim 60 wherein said ribbon is made of resistant metal.

62. A leak-proof pipe in accordance with claim 58 wherein said at least one sheet of lining material includes at least several ribbons, each of which is substantially longer than it is wide, arranged in side-by-side relationship with overlapped edge regions, each pair of overlapped edge regions being welded together in said pattern.

63. A leak-proof pipe in accordance with claim 58 wherein said at least several ribbons are laser-welded to said pipe at least one location.

64. A leak-proof pipe in accordance with claim 63 wherein said ribbons are made of resistant metal.

65. A leak-proof pipe in accordance with claim 57 wherein said at least one sheet of lining material is a ribbon whose width is substantially smaller than the length of said overlapped sheet edge regions and which is formed in the shape of a spiral having overlapped edge regions.

66. A leak-proof pipe in accordance with claim 65 wherein said ribbon is made of resistant metal.

67. A leak-proof pipe in accordance with claim 57 wherein said at least one sheet of lining material includes at least several ribbons, each of which is substantially longer than it is wide, arranged in side-by-side relationship with overlapped edge regions, each pair of overlapped edge regions being welded together in said pattern.

68. A leak-proof pipe in accordance with claim 67 wherein said ribbons are made of resistant metal.

69. A leak-proof pipe in accordance with claim 57 wherein said lining material is made of resistant metal.

70. A leak-proof pipe in accordance with claim 69 wherein said pipe is made of metal, and said overlapped edge regions are welded together by a laser weld.

71. A leak-proof vessel comprising at least one sheet of material with overlapped sheet edge regions at least five feet in total length, said regions being welded in a pattern consisting primarily of short intersecting closed lines each of which encloses a bounded area, said pattern having bounded areas with a maximum length of one foot along the length of said overlapped sheet edge regions along at least 75% of the length thereof.

72. A leak-proof vessel in accordance with claim 71 wherein said at least one sheet of material has the configuration of an open cylinder, and further including an open pipe therearound having an internal wall in contact with said open cylinder such that said open cylinder serves as a lining for said pipe.

73. A leak-proof vessel in accordance with claim 71 wherein said overlapped sheet edge regions are welded by a laser weld.

74. A leak-proof vessel in accordance with claim 73 wherein said at least one sheet of material is a ribbon whose width is substantially smaller than the total length of said overlapped sheet edge regions and which is formed in the shape of a spiral having overlapped edge regions.

75. A leak-proof vessel in accordance with claim 74 wherein said ribbon is laser-welded to said pipe at least one location therealong.

76. A leak-proof vessel in accordance with claim 75 wherein said ribbon is made of resistant metal.

77. A leak-proof vessel in accordance with claim 73 wherein said at least one sheet of material includes at least several ribbons, each of which is substantially longer than it is wide, arranged in side-by-side relationship with overlapped edge regions, each pair of overlapped edge regions being welded together in said pattern.

78. A leak-proof vessel in accordance with claim 77 wherein said ribbons are laser-welded to said pipe at least one location therealong.

79. A leak-proof vessel in accordance with claim 78 wherein said ribbons are made of resistant metal.

80. A leak-proof vessel in accordance with claim 75 wherein said at least one sheet of material is a ribbon whose width is substantially smaller than the total length of said overlapped sheet edge regions and which is formed in the shape of a spiral having overlapped edge regions.

81. A leak-proof vessel in accordance with claim 80 wherein said overlapped sheet edge regions are welded by a laser weld.

82. A leak-proof vessel in accordance with claim 81 wherein said ribbon is made of resistant metal.

83. A leak-proof vessel in accordance with claim 71 wherein said at least one sheet of material includes at least several ribbons, each of which is substantially longer than it is wide, arranged in side-by-side relationship with overlapped edge regions, each pair of overlapped edge regions being welded together in said pattern.

84. A leak-proof vessel in accordance with claim 83 wherein said overlapped sheet edge regions are welded together by laser welds.

85. A leak-proof vessel in accordance with claim 84 wherein said ribbons are made of resistant metal.

86. A leak-proof vessel in accordance with claim 71 wherein said at least one segment is welded by a laser weld.

87. A leak-proof weld pattern for a set of overlapping sheet edge regions at least five feet in total length consisting primarily of short intersecting closed lines each of which encloses a bounded region, said pattern having bounded regions with a maximum length of one foot along said overlapping sheet edge regions along at least 75% of the total length thereof.

88. A leak-proof weld pattern in accordance with claim 87 wherein said short closed lines are laser welds.

* * * * *